United States Patent
Sun et al.

(10) Patent No.: US 10,819,475 B2
(45) Date of Patent: Oct. 27, 2020

(54) UPLINK SEMI-PERSISTENT SCHEDULING FOR LOW LATENCY COMMUNICATIONS

(71) Applicant: QUALCOMM Incorporated, San Diego, CA (US)

(72) Inventors: Jing Sun, San Diego, CA (US); Wanshi Chen, San Diego, CA (US); Peter Gaal, San Diego, CA (US); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/599,744

(22) Filed: May 19, 2017

(65) Prior Publication Data
US 2018/0048432 A1 Feb. 15, 2018

Related U.S. Application Data

(60) Provisional application No. 62/374,679, filed on Aug. 12, 2016.

(51) Int. Cl.
*H04W 72/04* (2009.01)
*H04W 72/12* (2009.01)
(Continued)

(52) U.S. Cl.
CPC .......... *H04L 1/1861* (2013.01); *H04L 1/1819* (2013.01); *H04L 1/1845* (2013.01);
(Continued)

(58) Field of Classification Search
None
See application file for complete search history.

(56) References Cited

U.S. PATENT DOCUMENTS 8,885,526 B2 * 11/2014 He ............... H04L 12/2854
370/280
9,722,737 B2 * 8/2017 Fu ............... H04L 1/1607
(Continued)

OTHER PUBLICATIONS

Catt et al., "Configuration of UL Semi-Persistent Scheduling", 3GPP Draft: R2-082313_ configuration of UL Semipersistent Scheduling, 3rd Generation Partnership Project (3GPP), Mobile Competence Centre: 650, Route Des Lucioles; F-06921 Sophia-Antipolis Cedex; France, vol. RAN WG2, No. Kansas City, USA: Apr. 29, 2008, Apr. 29, 2008 (Apr. 29, 2008), XP050140060, 6 Pages, [retrieved on Apr. 29, 2008].
(Continued)

*Primary Examiner* — Edan Orgad
*Assistant Examiner* — Emmanuel K Maglo
(74) *Attorney, Agent, or Firm* — Holland & Hart LLP

(57) ABSTRACT

Methods, systems, and devices for wireless communication are described. A base station may configure a user equipment (UE) with a scheduling scheme to align the retransmission of semi-persistent scheduling (SPS) uplink messages with hybrid automatic repeat request (HARQ) feedback. Techniques for scheduling the retransmission of uplink messages on resources designated for SPS transmission, as opposed to resources not designated for SPS transmission, are also described. Aspects of the disclosure also include using incremental redundancy HARQ feedback to reduce packet loss at a receiver. In some cases, a base station receiving an uplink message may decode the message using multiple processes based on different assumptions regarding the redundancy version ID (RVID) of the uplink message.

22 Claims, 20 Drawing Sheets

(51) Int. Cl.
*H04L 1/18* (2006.01)
*H04W 56/00* (2009.01)

(52) U.S. Cl.
CPC ....... *H04L 1/1887* (2013.01); *H04W 56/0005* (2013.01); *H04W 72/0453* (2013.01); *H04W 72/1268* (2013.01)

(56) References Cited

U.S. PATENT DOCUMENTS

| | | | |
|---|---|---|---|
| 9,888,494 B2* | 2/2018 | Xia | H04L 5/001 |
| 10,433,333 B2* | 10/2019 | Yi | H04W 72/0446 |
| 2010/0182939 A1* | 7/2010 | Ojala | H04L 1/1854 |
| | | | 370/280 |
| 2010/0322175 A1* | 12/2010 | Chen | H04L 5/0007 |
| | | | 370/329 |
| 2011/0105136 A1* | 5/2011 | Choi | H04W 48/08 |
| | | | 455/452.1 |
| 2011/0310777 A1* | 12/2011 | Jiang | H04W 72/04 |
| | | | 370/280 |
| 2012/0087424 A1 | 4/2012 | Brown et al. | |
| 2012/0113910 A1* | 5/2012 | Jen | H04L 1/16 |
| | | | 370/329 |
| 2012/0327885 A1* | 12/2012 | Chung | H04L 1/1614 |
| | | | 370/329 |
| 2013/0176952 A1* | 7/2013 | Shin | H04L 5/001 |
| | | | 370/329 |
| 2014/0040694 A1* | 2/2014 | Verma | H04L 1/1812 |
| | | | 714/748 |
| 2015/0043480 A1* | 2/2015 | Lee | H04L 5/0055 |
| | | | 370/329 |
| 2015/0098371 A1* | 4/2015 | Vajapeyam | H04L 1/1822 |
| | | | 370/280 |
| 2015/0109972 A1* | 4/2015 | Khoryaev | H04L 65/1069 |
| | | | 370/329 |
| 2015/0180621 A1* | 6/2015 | Guan | H04B 1/713 |
| | | | 370/330 |
| 2015/0188670 A1* | 7/2015 | Lee | H04L 1/18 |
| | | | 370/329 |
| 2015/0215926 A1* | 7/2015 | Huang | H04W 36/0061 |
| | | | 370/329 |
| 2015/0282173 A1* | 10/2015 | Wang | H04W 72/0453 |
| | | | 370/329 |
| 2015/0282246 A1* | 10/2015 | Teyeb | H04W 36/0072 |
| | | | 370/312 |
| 2016/0205683 A1* | 7/2016 | Quan | H04W 16/10 |
| | | | 370/280 |
| 2016/0323071 A1* | 11/2016 | Berggren | H04L 5/001 |
| 2017/0111923 A1 | 4/2017 | Nogami et al. | |
| 2017/0290052 A1* | 10/2017 | Zhang | H04W 74/004 |
| 2018/0049229 A1* | 2/2018 | Dinan | H04L 1/1896 |
| 2018/0115985 A1* | 4/2018 | Lee | H04L 5/0094 |
| 2018/0270026 A1* | 9/2018 | Lee | H04L 1/1887 |

OTHER PUBLICATIONS

Ericsson: "Non-Adaptive Retransmissions for SPS with Skip Padding and Short Periods", 3GPP DRAFT; R2-163785 Non-Adaptive Retransmissions for SPS, 3rd Generation Partnership Project (3GPP), Mobile Competence Centre; 650, Route Des Lucioles; F-06921 Sophia-Antipolis Cedex ; France, vol. RAN WG2, No. Nanjing, China; May 23, 2016-May 27, 2016, May 22, 2016 (May 22, 2016), XP051105192, 4 Pages, Retrieved from the Internet: URL:http://www.3gpp.org/ftp/Meetings_3GPP SYNC/RAN2/Docs/ [retrieved on May 22, 2016].

Ericsson: "SPS Interval Alignment", 3GPP DRAFT; R2-163793 SPS Interval Alignment, 3rd Generation Partnership Project (3GPP), Mobile Competence Centre ; 650, Route Des Lucioles; F-06921 Sophia-Antipolis Cedex; France, vol. RAN WG2, No. Nanjing, China; May 23, 2016-May 27, 2016, May 22, 2016 (May 22, 2016), XP051105200, 2 Pages, Retrieved from the Internet: URL:http://www.3gpp.org/ftp/Meetings_3GPP SYNC/RAN2/Docs/ [retrieved on May 22, 2016].

Huawei et al., "Problem of UL DTX Detection", 3GPP Draft; R2-163915 Problem Of UL DTX Detection, 3rd Generation Partnership Project (3GPP), Mobile Competence Centre, 650, Route Des Lucioles; F-06921 Sophia-Antipolis Cedex; France vol. RAN WG2, No. Nanjing, China; May 23, 2016-May 27, 2016 May 14, 2016 (May 14, 2016), XP051095323, 2 Pages, Retrieved from the Internet: URL:http://www.3gpp.org/ftp/tsg ran/WG2 RL 2/TSGR2 94/Docs/ [retrieved on May 14, 2016].

International Search Report and Written Opinion—PCT/US2017/033720—ISA/EPO—dated Jan. 2, 2018.

Fiberhome: "Discussion of Retransmission for Short Sps Period", 3GPP Draft; R2-163386, 3rd Generation Partnership Project (3GPP), Mobile Competence Centre; 650, Route Des Lucioles; F-06921 Sophia-Antipolis Cedex; France, vol. RAN WG2, No. Nanjing, China; May 23, 2016-May 27, 2016, May 22, 2016 (May 22, 2016), XP051104916, 2 Pages, Retrieved from the Internet: URL:http://www.3gpp.org/ftp/Meetings_3GPP%20SYNC/RAN2/Docs/ [retrieved on May 22, 2016].

Imran L., et al., "Link Abstraction for Variable Bandwidth with Incremental Redundancy HARQ in LTE", 2013 11th International Symposium and Workshops on Modeling and Optimization in Mobile, AD HOC and Wireless Networks (WIOPT), IEEE, May 13, 2013 (May 13, 2013), XP032473482, pp. 23-28, [retrieved on Aug. 7, 2013].

Nokia et al., "Retransmission Collision with SPS Occasion", 3GPP Draft; R2-163703 Retrasnmission Collision with SPS Occasion, 3<sup>RD</sup> Generation Partnership Project (3GPP), Mobile Competence Centre; 650, Route Des Lucioles ; F-06921 Sophia-Antipolis Cedex; France, vol. RAN WG2, No. Nanjing, China; May 23, 2016-May 27, 2016, May 22, 2016 (May 22, 2016), XP051105121, 5 Pages, Retrieved from the Internet: URL:http://www.3gpp.org/ftp/Meetings_3GPP_SYNC/RAN2/Docs/ [retrieved on May 22, 2016].

Partial International Search Report and Written Opinion—PCT/US2017/033720—ISA/EPO—dated Sep. 7, 2017.

* cited by examiner

UPLINK SEMI-PERSISTENT SCHEDULING FOR LOW LATENCY COMMUNICATIONS

CROSS REFERENCES

The present application for patent claims priority to U.S. Provisional Patent Application No. 62/374,679 by Sun, et al., entitled "Uplink Semi-Persistent Scheduling for Low Latency Communications," filed Aug. 12, 2016, assigned to the assignee hereof, and which is hereby expressly incorporated by reference herein in its entirety.

BACKGROUND

The following relates generally to wireless communication and more specifically to semi-persistent scheduling (SPS) and hybrid automatic repeat request (HARD) feedback.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE).

A base station may configure a UE for SPS uplink communications by scheduling the UE to transmit uplink messages at a certain periodicity on reserved SPS resources. If one or more of the uplink messages is not received or successfully decoded by the base station, the UE may attempt to retransmit the uplink message. The retransmission of uplink messages may interfere with communications between the base station and other UEs if there is a lack of coordination between the SPS communication schedule and the uplink retransmissions.

SUMMARY

Aspects of the present disclosure include scheduling schemes to coordinate the retransmission of semi-persistent scheduling (SPS) uplink messages with hybrid automatic repeat request (HARQ) feedback timing. In some examples, SPS resources may be scheduled to align with HARQ feedback such that retransmissions of SPS uplink messages in response to HARQ feedback occurs during resources reserved for SPS communications. In other examples, HARQ feedback timing may be adjusted according to the periodicity of SPS uplink resources such that the HARQ feedback triggers SPS uplink retransmissions to occur during resources allocated for SPS communications. Additionally or alternatively to scheduling coordination, a user equipment (UE) may be configured to retransmit uplink messages on resources designated for SPS transmission and refrain from retransmitting uplink messages on resources not designated for SPS transmissions. Aspects also include using incremental redundancy HARQ feedback to reduce packet loss at a receiver. In some cases, a base station receiving an uplink message may decode the message using multiple processes based on different assumptions regarding the redundancy version ID (RVID) of the uplink message.

A method of wireless communication is described. The method may include identifying a HARQ process timing, identifying a duration between transmission time intervals (TTIs) designated for SPS uplink transmissions, configuring a carrier for the SPS uplink transmissions, wherein a schedule for the SPS uplink transmissions is based at least in part on the HARQ process timing and the duration between the TTIs designated for the SPS uplink transmissions, and transmitting signaling that indicates the carrier configuration and the schedule for the SPS uplink transmissions.

An apparatus for wireless communication is described. The apparatus may include means for identifying a HARQ process timing, means for identifying a duration between TTIs designated for SPS uplink transmissions, means for configuring a carrier for the SPS uplink transmissions, wherein a schedule for the SPS uplink transmissions is based at least in part on the HARQ process timing and the duration between the TTIs designated for the SPS uplink transmissions, and means for transmitting signaling that indicates the carrier configuration and the schedule for the SPS uplink transmissions.

Another apparatus for wireless communication is described. The apparatus may include a processor, memory in electronic communication with the processor, and instructions stored in the memory. The instructions may be operable to cause the apparatus to identify a HARQ process timing, identify a duration between TTIs designated for SPS uplink transmissions, configure a carrier for the SPS uplink transmissions, wherein a schedule for the SPS uplink transmissions is based at least in part on the HARQ process timing and the duration between the TTIs designated for the SPS uplink transmissions, and transmit signaling that indicates the carrier configuration and the schedule for the SPS uplink transmissions.

A non-transitory computer readable medium for wireless communication is described. The non-transitory computer-readable medium may include instructions operable to identify a HARQ process timing, identify a duration between TTIs designated for SPS uplink transmissions, configure a carrier for the SPS uplink transmissions, wherein a schedule for the SPS uplink transmissions is based at least in part on the HARQ process timing and the duration between the TTIs designated for the SPS uplink transmissions, and transmit signaling that indicates the carrier configuration and the schedule for the SPS uplink transmissions.

Some examples of the method, apparatus, and non-transitory computer-readable medium described above may further include processes, features, means, or instructions for receiving an uplink message during a first TTI designated for the SPS uplink transmissions according to the schedule. Some examples of the method, apparatus, and non-transitory computer-readable medium described above may further include processes, features, means, or instructions for receiving a retransmission of the uplink message on a second TTI designated for the SPS uplink transmissions, wherein a timing of the retransmission may be based at least in part on the schedule and the HARQ process timing.

Some examples of the method, apparatus, and non-transitory computer-readable medium described above may further include processes, features, means, or instructions for configuring the duration between TTIs designated for the SPS uplink transmissions based at least in part on the HARQ process timing. In some examples of the method, apparatus, and non-transitory computer-readable medium described above, the duration between TTIs designated for the SPS uplink transmissions may be configured to support retransmission of an uplink message according to the HARQ process timing during a TTI designated for the SPS uplink transmissions.

In some examples of the method, apparatus, and non-transitory computer-readable medium described above, the HARQ process timing comprises a duration of eight TTIs between a transmission and a retransmission. Some examples of the method, apparatus, and non-transitory computer-readable medium described above may further include processes, features, means, or instructions for configuring the HARQ process timing based at least in part on the duration between TTIs designated for the SPS uplink transmissions.

In some examples of the method, apparatus, and non-transitory computer-readable medium described above, the duration between TTIs designated for the SPS uplink transmissions may be configured to support retransmission of an uplink message according to the HARQ process timing during a TTI designated for the SPS uplink transmissions. In some examples of the method, apparatus, and non-transitory computer-readable medium described above, the duration between the TTIs designated for the SPS uplink transmissions comprises a duration of ten TTIs. Some examples of the method, apparatus, and non-transitory computer-readable medium described above may further include processes, features, means, or instructions for configuring a second HARQ process timing for uplink transmissions other than the SPS uplink transmissions.

A method of wireless communication is described. The method may include receiving signaling that indicates that a carrier is configured for SPS uplink transmissions, wherein a schedule for the SPS uplink transmissions is based at least in part on a HARQ process timing and a duration between TTIs designated for the SPS uplink transmissions, determining the duration between the TTIs designated for the SPS uplink transmissions based at least in part on the signaling, and communicating with a base station during the TTIs designated for the SPS uplink transmissions according to the schedule for the SPS uplink transmissions and the HARQ process timing.

An apparatus for wireless communication is described. The apparatus may include means for receiving signaling that indicates that a carrier is configured for SPS uplink transmissions, wherein a schedule for the SPS uplink transmissions is based at least in part on a HARQ process timing and a duration between TTIs designated for the SPS uplink transmissions, means for determining the duration between the TTIs designated for the SPS uplink transmissions based at least in part on the signaling, and means for communicating with a base station during the TTIs designated for the SPS uplink transmissions according to the schedule for the SPS uplink transmissions and the HARQ process timing.

Another apparatus for wireless communication is described. The apparatus may include a processor, memory in electronic communication with the processor, and instructions stored in the memory. The instructions may be operable to cause the apparatus to receive signaling that indicates that a carrier is configured for SPS uplink transmissions, wherein a schedule for the SPS uplink transmissions is based at least in part on a HARQ process timing and a duration between TTIs designated for the SPS uplink transmissions, determine the duration between the TTIs designated for the SPS uplink transmissions based at least in part on the signaling, and communicate with a base station during the TTIs designated for the SPS uplink transmissions according to the schedule for the SPS uplink transmissions and the HARQ process timing.

A non-transitory computer readable medium for wireless communication is described. The non-transitory computer-readable medium may include instructions operable to receive signaling that indicates that a carrier is configured for SPS uplink transmissions, wherein a schedule for the SPS uplink transmissions is based at least in part on a HARQ process timing and a duration between TTIs designated for the SPS uplink transmissions, determine the duration between the TTIs designated for the SPS uplink transmissions based at least in part on the signaling, and communicate with a base station during the TTIs designated for the SPS uplink transmissions according to the schedule for the SPS uplink transmissions and the HARQ process timing.

In some examples of the method, apparatus, and non-transitory computer-readable medium described above, communicating with the base station comprises: transmitting an uplink message during a first TTI designated for the SPS uplink transmissions according to the schedule. Some examples of the method, apparatus, and non-transitory computer-readable medium described above may further include processes, features, means, or instructions for retransmitting the uplink message on a second TTI designated for the SPS uplink transmissions, wherein a timing of the retransmission may be based at least in part on the schedule and the HARQ process timing.

Some examples of the method, apparatus, and non-transitory computer-readable medium described above may further include processes, features, means, or instructions for receiving a negative acknowledgement (NACK), wherein retransmitting the uplink message on the second TTI designated for the SPS uplink transmissions may be based at least in part on receiving the NACK.

A method of wireless communication is described. The method may include receiving signaling that indicates that a carrier is configured for SPS uplink transmissions, wherein the signaling indicates a schedule for a plurality of TTIs designated for the SPS uplink transmissions, transmitting an uplink message on a first TTI of the plurality of TTIs designated for the SPS uplink transmissions, determining that the uplink message was unsuccessfully decoded based at least in part on an absence of signaling in a downlink TTI that is designated for HARQ feedback according to a HARQ process timing, refraining from retransmitting the uplink message in a first uplink TTI that is designated for retransmission according to the HARQ process timing, wherein the plurality of TTIs designated for the SPS uplink transmissions excludes the first uplink TTI, and retransmitting the uplink message in a second uplink TTI of the plurality of TTIs designated for the SPS uplink transmissions.

An apparatus for wireless communication is described. The apparatus may include means for receiving signaling that indicates that a carrier is configured for SPS uplink transmissions, wherein the signaling indicates a schedule for a plurality of TTIs designated for the SPS uplink transmissions, means for transmitting an uplink message on a first TTI of the plurality of TTIs designated for the SPS uplink transmissions, means for determining that the uplink message was unsuccessfully decoded based at least in part on an absence of signaling in a downlink TTI that is designated for HARQ feedback according to a HARQ process timing, means for refraining from retransmitting the uplink message in a first uplink TTI that is designated for retransmission according to the HARQ process timing, wherein the plurality of TTIs designated for the SPS uplink transmissions excludes the first uplink TTI, and means for retransmitting the uplink message in a second uplink TTI of the plurality of TTIs designated for the SPS uplink transmissions.

Another apparatus for wireless communication is described. The apparatus may include a processor, memory in electronic communication with the processor, and instructions stored in the memory. The instructions may be operable to cause the apparatus to receive signaling that indicates that a carrier is configured for SPS uplink transmissions, wherein the signaling indicates a schedule for a plurality of TTIs designated for the SPS uplink transmissions, transmit an uplink message on a first TTI of the plurality of TTIs designated for the SPS uplink transmissions, determine that the uplink message was unsuccessfully decoded based at least in part on an absence of signaling in a downlink TTI that is designated for HARQ feedback according to a HARQ process timing, refrain from retransmitting the uplink message in a first uplink TTI that is designated for retransmission according to the HARQ process timing, wherein the plurality of TTIs designated for the SPS uplink transmissions excludes the first uplink TTI, and retransmit the uplink message in a second uplink TTI of the plurality of TTIs designated for the SPS uplink transmissions.

A non-transitory computer readable medium for wireless communication is described. The non-transitory computer-readable medium may include instructions operable to receive signaling that indicates that a carrier is configured for SPS uplink transmissions, wherein the signaling indicates a schedule for a plurality of TTIs designated for the SPS uplink transmissions, transmit an uplink message on a first TTI of the plurality of TTIs designated for the SPS uplink transmissions, determine that the uplink message was unsuccessfully decoded based at least in part on an absence of signaling in a downlink TTI that is designated for HARQ feedback according to a HARQ process timing, refrain from retransmitting the uplink message in a first uplink TTI that is designated for retransmission according to the HARQ process timing, wherein the plurality of TTIs designated for the SPS uplink transmissions excludes the first uplink TTI, and retransmit the uplink message in a second uplink TTI of the plurality of TTIs designated for the SPS uplink transmissions.

A method of wireless communication is described. The method may include identifying a HARQ process timing, configuring a carrier for SPS uplink transmissions with a plurality of TTIs designated for the SPS uplink transmissions, unsuccessfully decoding an uplink message transmitted during a first TTI of the plurality of TTIs designated for the SPS uplink transmissions, and receiving a retransmission of the uplink message during a second TTI of the plurality of TTIs designated for the SPS uplink transmissions, wherein the carrier is configured with a first uplink TTI that precedes the second TTI of the plurality of TTIs designated for the SPS uplink transmissions and the first uplink TTI is designated for the retransmission of the uplink message according to the HARQ process timing.

An apparatus for wireless communication is described. The apparatus may include means for identifying a HARQ process timing, means for configuring a carrier for SPS uplink transmissions with a plurality of TTIs designated for the SPS uplink transmissions, means for unsuccessfully decoding an uplink message transmitted during a first TTI of the plurality of TTIs designated for the SPS uplink transmissions, and means for receiving a retransmission of the uplink message during a second TTI of the plurality of TTIs designated for the SPS uplink transmissions, wherein the carrier is configured with a first uplink TTI that precedes the second TTI of the plurality of TTIs designated for the SPS uplink transmissions and the first uplink TTI is designated for the retransmission of the uplink message according to the HARQ process timing.

Another apparatus for wireless communication is described. The apparatus may include a processor, memory in electronic communication with the processor, and instructions stored in the memory. The instructions may be operable to cause the apparatus to identify a HARQ process timing, configure a carrier for SPS uplink transmissions with a plurality of TTIs designated for the SPS uplink transmissions, unsuccessfully decode an uplink message transmitted during a first TTI of the plurality of TTIs designated for the SPS uplink transmissions, and receive a retransmission of the uplink message during a second TTI of the plurality of TTIs designated for the SPS uplink transmissions, wherein the carrier is configured with a first uplink TTI that precedes the second TTI of the plurality of TTIs designated for the SPS uplink transmissions and the first uplink TTI is designated for the retransmission of the uplink message according to the HARQ process timing.

A non-transitory computer readable medium for wireless communication is described. The non-transitory computer-readable medium may include instructions operable to identify a HARQ process timing, configure a carrier for SPS uplink transmissions with a plurality of TTIs designated for the SPS uplink transmissions, unsuccessfully decode an uplink message transmitted during a first TTI of the plurality of TTIs designated for the SPS uplink transmissions, and receive a retransmission of the uplink message during a second TTI of the plurality of TTIs designated for the SPS uplink transmissions, wherein the carrier is configured with a first uplink TTI that precedes the second TTI of the plurality of TTIs designated for the SPS uplink transmissions and the first uplink TTI is designated for the retransmission of the uplink message according to the HARQ process timing.

Some examples of the method, apparatus, and non-transitory computer-readable medium described above may further include processes, features, means, or instructions for unsuccessfully decoding the uplink message transmitted during the first TTI of the plurality of TTIs designated for the SPS uplink transmissions comprises not receiving the uplink message.

A method of wireless communication is described. The method may include configuring a carrier for SPS uplink transmissions, receiving an uplink message during a TTI designated for the SPS uplink transmissions, decoding the uplink message according to a first operation that is based at least in part on an assumption that the uplink message is a first transmission of the uplink message, and decoding the uplink message according to a second operation that is based at least in part on an assumption that the uplink message is a second transmission of the uplink message, wherein the second operation comprises combining the uplink message with at least one prior uplink message received at a predetermined number of TTIs before the uplink message.

An apparatus for wireless communication is described. The apparatus may include means for configuring a carrier for SPS uplink transmissions, means for receiving an uplink message during a TTI designated for the SPS uplink transmissions, means for decoding the uplink message according to a first operation that is based at least in part on an assumption that the uplink message is a first transmission of the uplink message, and means for decoding the uplink message according to a second operation that is based at least in part on an assumption that the uplink message is a second transmission of the uplink message, wherein the second operation comprises combining the uplink message with at least one prior uplink message received at a predetermined number of TTIs before the uplink message.

Another apparatus for wireless communication is described. The apparatus may include a processor, memory in electronic communication with the processor, and instructions stored in the memory. The instructions may be operable to cause the apparatus to configure a carrier for SPS uplink transmissions, receive an uplink message during a TTI designated for the SPS uplink transmissions, decode the uplink message according to a first operation that is based at least in part on an assumption that the uplink message is a first transmission of the uplink message, and decode the uplink message according to a second operation that is based at least in part on an assumption that the uplink message is a second transmission of the uplink message, wherein the second operation comprises combining the uplink message with at least one prior uplink message received at a predetermined number of TTIs before the uplink message.

A non-transitory computer readable medium for wireless communication is described. The non-transitory computer-readable medium may include instructions operable to configure a carrier for SPS uplink transmissions, receive an uplink message during a TTI designated for the SPS uplink transmissions, decode the uplink message according to a first operation that is based at least in part on an assumption that the uplink message is a first transmission of the uplink message, and decode the uplink message according to a second operation that is based at least in part on an assumption that the uplink message is a second transmission of the uplink message, wherein the second operation comprises combining the uplink message with at least one prior uplink message received at a predetermined number of TTIs before the uplink message.

Some examples of the method, apparatus, and non-transitory computer-readable medium described above may further include processes, features, means, or instructions for decoding the uplink message according to a third operation that may be based at least in part on an assumption that the uplink message may be a third transmission of the uplink message, wherein the third operation comprises combining the uplink message with at least two prior uplink messages each received at a predetermined number of TTIs before the uplink message.

Some examples of the method, apparatus, and non-transitory computer-readable medium described above may further include processes, features, means, or instructions for decoding the uplink message according to a fourth operation that may be based at least in part on an assumption that the uplink message may be a fourth transmission of the uplink message, wherein the fourth operation comprises combining the uplink message with at least three prior uplink messages each received at a predetermined number of TTIs before the uplink message.

In some examples of the method, apparatus, and non-transitory computer-readable medium described above, the predetermined number of TTIs comprises a multiple of eight TTIs. Some examples of the method, apparatus, and non-transitory computer-readable medium described above may further include processes, features, means, or instructions for determining a redundancy version of a HARQ process of the uplink message based at least in part on decoding the uplink message according to the first operation and decoding the uplink message according to the second operation.

DETAILED DESCRIPTION

Figure 1:
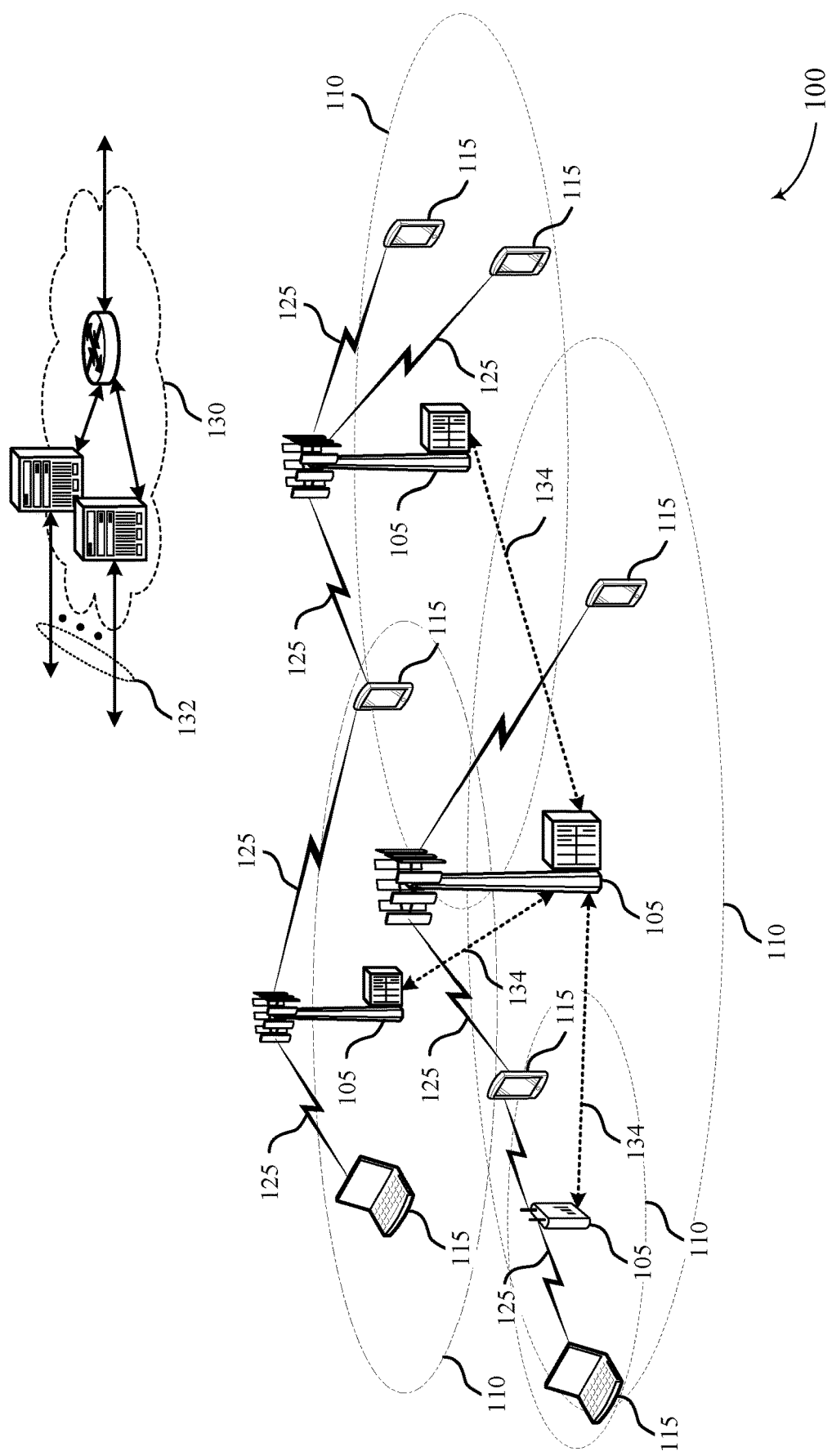
FIG. 1 illustrates an example of a system for wireless communication that supports uplink semi-persistent scheduling (SPS) for low latency enhancement in accordance with aspects of the present disclosure.

A wireless communications network may support semi-persistent scheduling (SPS) for uplink communications. For example, a base station may schedule a user equipment (UE) to transmit uplink messages on resources reserved at a set periodicity (e.g., 20 ms). In some cases, the UE may attempt to retransmit an uplink message that was not decoded by the base station. Uplink scheduling schemes may be used to coordinate the retransmission of uplink messages with hybrid automatic repeat request (HARQ) feedback timing so that retransmissions occur during resources reserved for SPS communications. Additionally or alternatively, a UE may refrain from retransmitting an uplink message on resources other than those reserved for SPS communications, even if other uplink resources are available for the retransmission. These uplink scheduling schemes and UE transmission configurations may support latency-reducing techniques in a wireless network while reducing instances of retransmissions that create interference at a base station.

In some cases, a schedule for SPS uplink retransmissions is configured to align with a HARQ process timing. For example, a duration between transmission time intervals (TTIs) reserved for SPS uplink transmissions may be configured so that SPS uplink retransmissions in response to HARQ feedback occur during TTIs reserved for SPS uplink transmissions. Alternatively, HARQ feedback timing for a communications link may be configured to align with the duration between SPS TTIs. In some cases, a UE may transmit uplink SPS messages according to a HARQ feedback timing configured for the SPS communications link, but may also transmit non-SPS messages according to a different HARQ feedback timing.

A UE may be configured to refrain from retransmitting an uplink message on certain resources based on an SPS communications schedule. For example, a UE attempting to retransmit an uplink message may be scheduled to retransmit the message on resources that are not allocated for SPS uplink communications. Instead of retransmitting the message on these resources, the UE may wait to retransmit the message on resources that are allocated for SPS uplink communications.

A wireless communications network supporting SPS communications may also support incremental redundancy (IR) HARQ feedback schemes. In some cases, instead of assuming each received uplink message is a first transmission of that message, a base station may decode the uplink message based on one or more assumptions about the redundancy version ID (RVID) of the uplink message. Based on these assumptions, the base station may combine the uplink message with one or more previous uplink messages to realize an increase in received energy of the message at the base station.

Aspects of the disclosure introduced above are described below in the context of an exemplary wireless communications system. Examples of SPS scheduling and HARQ process timing schemes are described. In addition, examples of uplink message decoding based on multiple RVID assumptions are described. Aspects of the disclosure are further illustrated by and described with reference to apparatus diagrams, system diagrams, and flowcharts that relate to uplink SPS for low latency enhancement.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a LTE (or LTE-Advanced) network. The wireless communications system 100 may support SPS communications between base stations 105 and UEs 115. Base stations 105 or UEs 115 may be configured to retransmit uplink messages on resources reserved for SPS uplink transmissions.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. UEs 115 may be dispersed throughout the wireless communications system 100, and each UE 115 may be stationary or mobile.

A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

HARQ is an error management technique that may result in reduced packet loss and increased throughput over a wireless communication link 125. HARQ may include a combination of error detection (e.g., using a CRC), forward error correction (FEC), and retransmission (e.g., automatic repeat request (ARQ)). HARQ may improve throughput at the media access control (MAC) layer in poor radio conditions (e.g., signal-to-noise conditions). In IR HARQ, incorrectly received data may be stored in a buffer and combined with subsequent transmissions to improve the overall likelihood of successfully decoding the data. In some cases, redundancy bits are added to each message prior to transmission. This may be useful in poor conditions. In other cases, redundancy bits are not added to each transmission, but are retransmitted after the transmitter of the original message receives a negative acknowledgement (NACK) indicating a failed attempt to decode the information. The chain of transmission, response and retransmission may be referred to as a HARQ process. In some cases, a limited number of HARQ processes may be used for a given communication link 125.

Wireless communication system 100 may support dynamic scheduling of resources to a UE 115. Dynamic scheduling of resources may involve transmitting an uplink grant to UE 115 for each assignment of resources for a subsequent uplink data transmission. In some examples, a base station 105 may transmit the grant using a physical downlink control channel (PDCCH) or a physical downlink shared channel (PDSCH). The resource assignment included in the grant may indicate time and frequency resources such as a TTI, or a portion of a TTI, and a range of radio frequencies associated with a subsequent data transmission. Dynamic scheduling of resources may allow for increased flexibility when assigning resources to a UE 115. However, dynamic allocation of resources may cause additional overhead if a base station 105 allocates the same resources to a UE 115 periodically (e.g., for voice over internet protocol (VoIP) transmissions).

Wireless communication system 100 may support SPS communications between a UE 115 and a base station 105, which may decrease signaling overhead and allow for ready uplink (or, in some cases, downlink) transmissions without the necessity of repeated resource grants. SPS may involve scheduling specific resources to UE 115 (e.g., resources on the physical uplink shared channel (PUSCH)) for a current transmission and for multiple future transmissions. Base station 105 may configure a UE 115 for SPS by indicating the resources allocated to the UE 115 and a periodicity of the resource allocations. For example, base station 105 may designate frequency resources on specific TTIs (e.g., SPS TTIs) for SPS uplink transmissions from a UE 115. The SPS configuration may be indicated by base station 105 using radio resource control (RRC) signaling (e.g., in an SPS-config message). To activate SPS for a particular UE 115, the base station 105 may send a scheduling command or scheduling grant to UE 115.

In some cases, the periodicity of the resource allocations may be defined by the duration between TTIs designated for SPS uplink transmissions. For example, the base station 105 my schedule the UE 115 to transmit an uplink message every ten TTIs. By using SPS allocations, base station 105 may avoid the overhead associated with repeated uplink grant transmissions for data communications occurring at a predictable rate. In some examples, the resource block (RB) assignments, the modulation and coding scheme (MCS), and the like, may be similar for all uplink transmissions using the allocated SPS resources. Furthermore, wireless communication system 100 may support techniques for releasing an SPS configuration when a UE 115 repeatedly fails to use the allocated resources (e.g., when UE 115 has no data to transmit for a period of time).

In some cases, the periodicity of SPS resource allocations may be equal to or greater than 10 ms (e.g., 10 ms, 20 ms, 40 ms, 80 ms). A UE 115 may use these resources to communicate with base station 105 by transmitting data or control packets using the uplink SPS resources. For example, UE 115 may transmit packets to base station 105 at a predictable rate when using a VoIP service. In some examples, UE 115 may be scheduled for an SPS uplink transmission, but UE 115 may not have data to transmit. As such, UE 115 may transmit zero-padded packets to base station 105. The transmission of zero-padded packets may allow base station 105 to determine when to cancel an SPS configuration for UE 115. For example, after receiving a threshold number of zero-padded packets consecutively, base station 105 may cancel an SPS configuration for UE 115 by releasing the SPS resources. Additionally, because the base station 105 is always expecting an uplink message on each SPS TTI, the transmission of zero-padded packets may allow base station 105 to determine when a packet was not received due to interference or the like.

In some examples, if base station 105 does not receive a zero-padded packet or a data packet, base station 105 may transmit a NACK message to UE 115. By transmitting a NACK, base station 105 may implicitly allocate resources for UE 115 to retransmit the packet in subsequent subframes (e.g., 4 subframes after transmitting the NACK). In some cases, if the implicitly allocated resources overlap with SPS resources, a message retransmission of a message may be dropped and a UE 115 may transmit a packet with new data instead. That is, in some cases, the transmission of new data is prioritized over the retransmission of data if the retransmission is scheduled to occur during an SPS TTI. In other cases, if the implicitly allocated resources overlap with SPS resources, a packet with new data may be dropped and a UE 115 may retransmit a previously transmitted packet instead. The prioritization of new data transmissions or retransmissions may be based on the periodicity of an SPS allocation. If the implicitly allocated resources do not overlap with SPS resources, UE 115 may retransmit a previously transmitted packet using the implicitly allocated resources.

For example, a UE 115 may transmit data using SPS resources over a subframe N. Base station 105 may then receive the data and transmit a HARQ message (e.g., ACK or NACK) to UE 115 over, for example, subframe N+4. In some cases, the HARQ message may include an ACK, and UE 115 may refrain from retransmitting the data since the first transmission was successfully received by base station 105. Alternatively, the HARQ message may include a NACK, and UE 115 may retransmit the data at, for example, subframe N+8. If base station 105 transmits a NACK and subframe N+8 overlaps with an SPS subframe, UE 115 may prioritize the retransmission or the new data transmission depending on a predetermined configuration. If base station 105 transmits a NACK and subframe N+8 does not overlap with an SPS subframe, UE 115 may retransmit the data using the implicitly allocated resources.

In some cases, to support lower latency applications, wireless communication system 100 may support lower SPS periodicities to provide more resources for UE 115 to communicate periodically with base station 105. Additionally, a lower periodicity may result in lower latency since UE 115 may transmit packets to base station 105 more frequently.

Wireless communication system 100 may support a lower periodicity of SPS resource allocations (e.g., 1 ms or 0.5 ms) to support low latency applications and techniques. Due to the increased frequency of available SPS uplink resources, it is more likely that for any given uplink SPS TTI, a UE 115 may not have data to transmit. In such cases, the frequent transmission of zero-padded packets may increase the power consumption at UE 115 and increase the chances of interference with other transmissions. Therefore, in some cases, UE 115 may refrain from transmitting zero-padded packets (e.g., SPS PUSCH skipping) to base station 105 when UE 115 has no data to transmit during a particular SPS TTI. However, when UE 115 refrains from transmitting zero-padded packets, base station 105 may not be able to determine if UE 115 did not transmit a packet or if base station 105 did not receive an attempted transmission from UE 115.

As such, in some cases, base station 105 may be configured to refrain from transmitting a HARQ message after determining that it did not receive a data transmission from UE 115. This configuration may prevent unnecessarily frequent NACK messages resulting from skipped SPS uplink transmissions. Since UE 115 may not receive HARQ feedback if base station 105 failed to receive an uplink message, UE 115 may be configured to determine that base station 105 refrained from transmitting a HARQ message. However, this determination may increase overhead and, in some cases, there may be some residual errors associated with the determination. Alternatively, in cases where the base station 105 does not send a NACK after failing to receive an uplink message, UE 115 may try to detect a HARQ message (e.g., an erased HARQ message) and arbitrarily declare detection results (e.g., with equal probability for declaring an ACK or a NACK). For example, UE 115 may transmit data using SPS resources at subframe N. Base station 105 may fail to detect the data transmission and, as such, base station 105 may not transmit a HARQ message at, for example, subframe N+4. When UE 115 decodes the erased HARQ message as an ACK, UE 115 may refrain from retransmitting the data and previously transmitted data may be lost.

In cases when UE 115 decodes the erased HARQ message as a NACK and the allocated resources for retransmission overlap with SPS resources, UE 115 may retransmit the data successfully. In cases when UE 115 decodes the erased HARQ message as a NACK and the allocated resources for retransmission do not overlap with SPS resources, UE 115 may attempt to retransmit the data. However, base station 105 may have not received the first transmission and may not be configured to determine that UE 115 attempted a first transmission. Accordingly, base station 105 may have not expected to receive the retransmission, and base station 105 may have not implicitly allocated resources for UE 115.

Instead, base station 105 may have allocated those resources for another UE 115. As such, the attempted retransmission by UE 115 may interfere with an attempted transmission from another UE 115. As such, data included in both transmissions may be lost since base station 105 may not be able to decode the transmissions.

Alternatively, in other cases, base station 105 may be configured to transmit a NACK after determining that it did not receive a data transmission from UE 115. If the SPS period is short, it may be inefficient for base station 105 to transmit a HARQ message in response to every data transmission. However, if the resources have been allocated for HARQ transmission for SPS, it may be inefficient to not transmit a HARQ message in response to every data transmission. In some examples, UE 115 may transmit data using SPS resources at subframe N. Base station 105 may fail to detect the data transmission, and base station 105 may transmit a NACK at, for example, subframe N+4. Since base station 105 considers that UE 115 may have not attempted to transmit data, no resources are implicitly allocated by transmitting the NACK. However, after receiving the NACK, UE 115 may determine that resources were implicitly allocated for a retransmission. If the resources for retransmission overlap with SPS resources, UE may retransmit the data successfully. Alternatively, if the resources for retransmission do not overlap with SPS resources, the retransmission of data by UE 115 may collide with a transmission from another UE 115.

Accordingly, in some cases, wireless communication system 100 may support techniques to prevent multiple UEs 115 from using the same resources for different transmissions.

Furthermore, an error correction scheme associated with retransmissions may support soft combining where incorrectly received data from previous transmissions is combined with incorrectly received data from a current transmission to determine the correct data. In some examples, soft combining may involve chase combining (CC) where each retransmission contains the same information and multiple transmissions may be combined to determine the correct transmission. In other examples, soft combining may involve incremental redundancy where each retransmission contains different information and multiple transmissions may be combined to determine the correct transmission. A UE 115 supporting IR may use a redundancy version identifier (RVID) associated with each transmission to indicate a number of previously attempted transmissions.

For example, RVID0 may indicate that the transmission is a first transmission of an uplink message and RVID 2 may indicate that the transmission is a first retransmission of the uplink message. An RVID sequence may be 0/2/3/1. A base station 105 may use this information to determine a number of previously attempted transmissions. The base station 105 may then combine a current transmission with previous transmissions. However, if a base station 105 fails to receive a previous transmission, an error may occur when the receiving base station 105 tries to combine a current transmission with the previous transmission. As such, UE 115 may be configured to indicate that each transmission is a first transmission regardless of whether the transmission is a retransmission. In other words, the UE 115 may indicate a first version (e.g., RVID0) for all retransmissions since a base station 105 may have missed a previous transmission.

However, in some cases, wireless communication system 100 may support incremental redundancy with different RVIDs to increase the chances of correctly decoding a transmission with less retransmissions.

Figure 2:
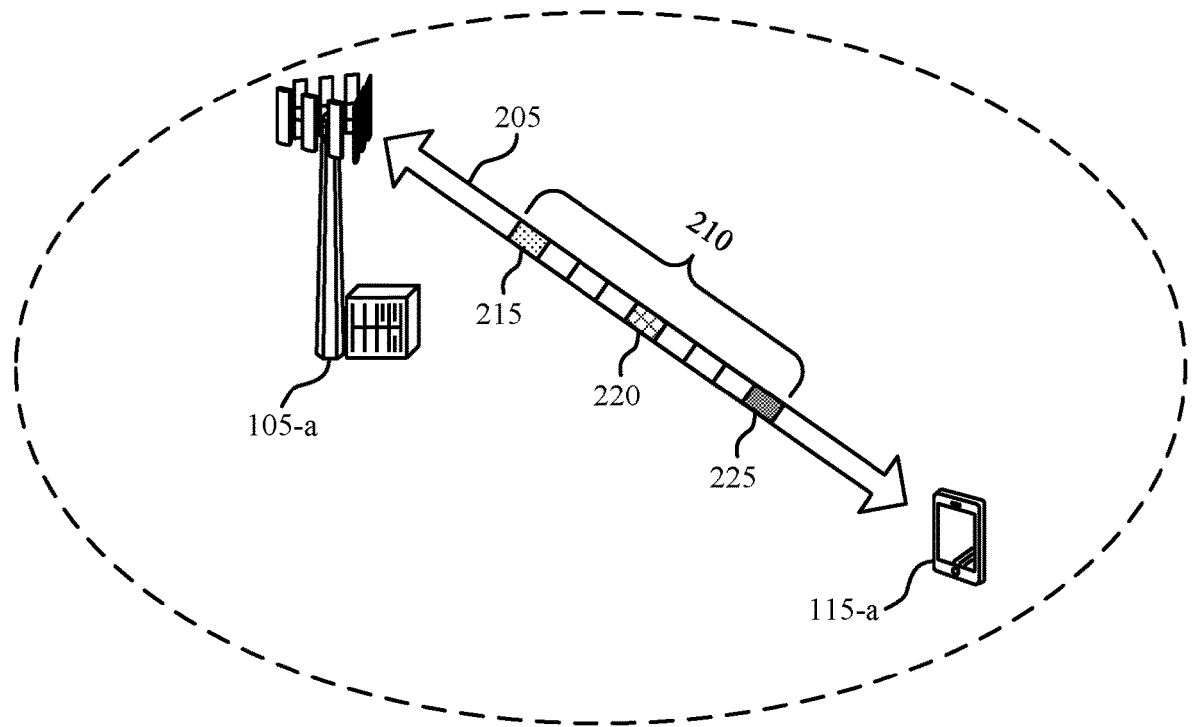
FIG. 2 illustrates another example of a system for wireless communication that supports uplink SPS for low latency enhancement in accordance with aspects of the present disclosure.

FIG. 2 illustrates an example of a wireless communication system 200 that supports uplink SPS for low latency communications. Wireless communications system 200 may include a base station 105-*a* and a UE 115-*a*, which may be examples of corresponding devices described with reference to FIG. 1. Base station 105-*a* may configure a communications link 205 (e.g., a carrier) between UE 115-*a* and base station 105-*a* for SPS communications. Configuring SPS communications may include reserving a number of resources (e.g., TTIs) at a certain periodicity for UE 115-*a* to transmit uplink resources on. For example, base station 105-*a* may reserve one or more TTIs from the TTI group 210 for SPS uplink communications. In the example illustrated in FIG. 2, TTI 215 is reserved for uplink SPS transmissions. TTI 220 is reserved for HARQ feedback from base station 105-*a* (e.g., 4 TTIs after the uplink message), and TTI 225 is also reserved for uplink SPS transmissions.

Wireless communication system 200 may support techniques to increase the efficiency of SPS processes and improve throughput in the system. For example, base station 105-*a* may adjust SPS uplink transmission schedules or HARQ process timing to avoid uplink retransmissions on non-SPS resources. In other examples, base station 105-*a* may configure UE 115 to refrain from retransmitting data using non-SPS resources. Since SPS resource allocations are predetermined and preconfigured for UE 115-*a*, base station 105-*a* may refrain from allocating these resources to other UEs 115. Wireless communication system 200 may also support techniques for increasing the efficiency of HARQ processes by implementing incremental redundancy.

Base station 105-*a* may schedule SPS resources or configure HARQ processes to avoid retransmissions of uplink messages on non-SPS subframes. In some cases, base station 105-*a* may schedule SPS resources for UE 115 based on the timing of a HARQ process. In some examples, base station 105-*a* may transmit an ACK or NACK (e.g., on TTI 220) in response to a first transmission from UE 115-*a* (e.g., on TTI 215) four subframes after the first transmission. UE 115-*a* may receive, decode, and process the ACK or NACK four subframes later. Therefore, the turnaround time for the HARQ process may be 8 subframes (e.g., TTIS) or 8 ms. As such, base station 105-*a* may allocate SPS resources for UE 115 with a periodicity of 8 ms to avoid retransmissions on non-SPS subframes (e.g., 8 TTIs between TTI 215 and TTI 225). Alternatively, base station 105-*a* may adjust the timing of a HARQ process based on an SPS periodicity.

For example, if the SPS periodicity is 10 ms, base station 105-*a* may adjust HARQ timing so that the turnaround time for the HARQ process is 10 subframes or 10 ms. In some cases, the examples presented above may apply to different periodicities associated with an SPS configuration and different timing for HARQ processes. For example, if the turnaround time for a HARQ process is 10 ms, the duration between TTIs dedicated to SPS uplink transmissions may be adjusted to 5 ms, and if the periodicity of an SPS configuration is 10 ms, HARQ timing may be adjusted so that the turnaround time for the HARQ process is 20 subframes or 20 ms.

In some cases, base station 105-*a* may configure UE 115-*a* to refrain from retransmitting an uplink message on non-SPS subframes if the uplink message was originally transmitted on an SPS subframe. For example, UE 115-*a* may transmit an uplink message during a TTI designated as an SPS subframe (e.g., TTI 215). UE 115-*a* may then determine that a retransmission will happen during a TTI that is not designated as an SPS subframe. Accordingly, UE 115-*a* may not attempt to decode a HARQ message received during TTI 220, and UE 115-*a* may refrain from retransmitting the uplink message during the non-SPS TTI. In some cases, base station 105-*a* may have not received the original uplink transmission during TTI 215, and base station 105-*a* may consider that UE 115-*a* did not have data to transmit. As such, base station 105-*a* may reassign the resources assigned for retransmission from UE 115-*a* (e.g., the non-SPS TTI) to another UE 115. However, since UE 115-*a* refrained from transmitting during TTI 225, overlapping transmissions from both UEs 115 may be avoided. If the timing of a retransmission from UE 115-*a* overlaps with SPS resources, UE 115-*a* may prioritize the retransmission over the transmission of new data. In some examples, by avoiding retransmission, data included in a previous transmission may be lost. However, this approach may prevent multiple UEs 115 from transmitting using the same resources, and a transmission from another UE 115 may be successful.

Furthermore, wireless communication system 200 may support techniques for increasing the efficiency of a HARQ process. For example, base station 105-*a* may support multiple redundancy versions to increase the chances of correctly decoding a transmission from UE 115-*a* with less retransmissions. In some examples, the redundancy version of a transmission may be incremented for each retransmission. As such, base station 105 may use IR techniques to determine a correct transmission from a current transmission and previous failed transmissions. However, in some cases, base station 105-*a* may not be able to determine a redundancy version of a message. Therefore, base station 105-*a* may be configured to decode an uplink message using a number of different hypotheses regarding the redundancy version of the message.

For example, base station 105-*a* may receive an uplink message and may not be able to determine if the message is an original transmission (e.g., RVID0), a first retransmission (e.g., RVID2), a second retransmission (e.g., RVID3), or a third retransmission (e.g., RVID1). In some cases, base station 105-*a* may attempt to decode the message multiple times using different assumptions regarding the RVID of the message. For example, base station 105-*a* may first assume the message was a first transmission of the message and try to decode it without combining the message with any previously transmitted messages. If base station 105-*a* is not able to decode the message, base station 105-*a* may then assume the message is a first retransmission of the message and may then attempt to combine this transmission with a previous transmission received, for example, 8 subframes earlier.

If base station 105-*a* is still unable to decode the message, base station 105-*a* may assume the message was a second retransmission of the message and may attempt to combine this transmission with a previous transmission received, for example, 16 subframes earlier and a previous transmission received, for example, 8 subframes earlier.

If base station 105-*a* is still unable to decode the message, base station 105-*a* may assume the message was a third retransmission of the message and may attempt to combine this transmission with a previous transmission received, for example, 24 subframes earlier, a previous transmission received, for example, 16 subframes earlier, and a previous transmission received, for example, 8 subframes earlier. Base station 105-*a* may perform the decoding processes in series or in parallel.

In some cases, if a redundancy version is not incremented for each retransmission, base station 105-*a* may attempt to combine a current transmission with transmissions received in previous subframes (e.g., multiples of 8 subframes previous to the current subframe). However, if the redundancy version is not incremented, an error correction scheme may benefit from the gain associated with Chase combining but not from the gain associated with IR.

Figure 3A:
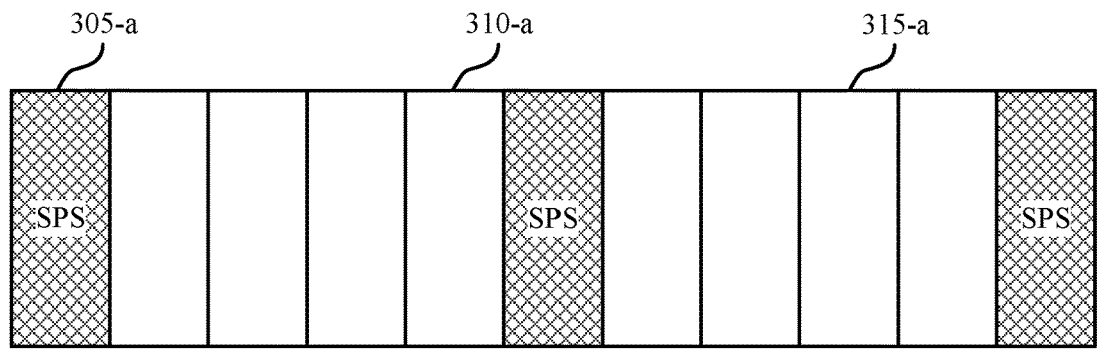
FIGS. 3A-3C illustrate examples of a SPS uplink transmission scheduling that supports uplink SPS for low latency enhancement in accordance with aspects of the present disclosure.
Figure 3B:
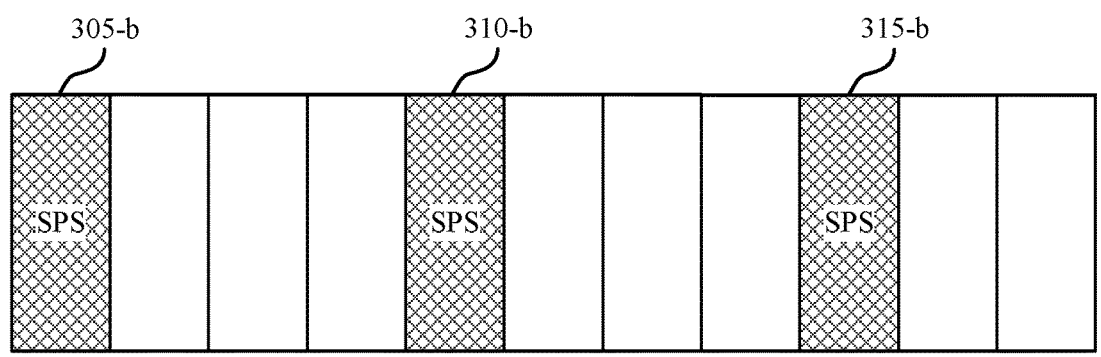
Figure 3C:
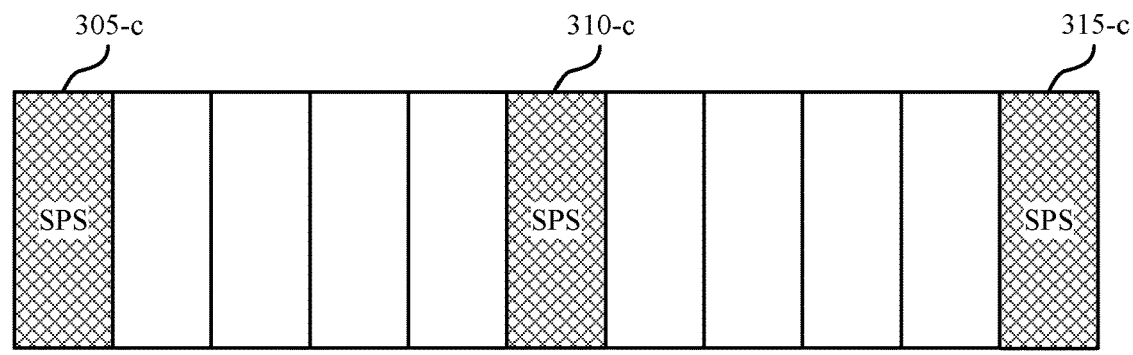

FIGS. 3A-3C illustrate examples of scheduling techniques 300 that support uplink SPS for low latency communications. In the example of FIGS. 3A-3C, the scheduling techniques may be used to align the timing of retransmissions with resources allocated for SPS uplink transmissions.

FIG. 3A illustrates an example of misalignment of resources scheduled for SPS uplink transmissions and resources used to retransmit data according to HARQ timing. For example, a first UE 115 may transmit data to a base station 105 during first TTI 305-*a*. In some cases, first TTI 305-*a* may be designated for an SPS uplink transmission. Subsequently, a base station 105 may unsuccessfully decode the transmission or miss the transmission completely. The base station 105 may then transmit a NACK in second TTI 310-*a* indicating that a transmission was unsuccessfully decoded or not received. Accordingly, the first UE 115 may attempt to retransmit the data during third TTI 315-*a*, which may not be designated for an SPS uplink transmission. If the base station 105 did not receive the initial transmission during first TTI 305-*a*, the base station 105 may have allocated the resources at third TTI 315-*a* to a second UE 115. Therefore, a retransmission from a first UE 115 may interfere with a transmission from a second UE 115 using the same resources.

FIG. 3B illustrates an example of alignment of resources scheduled for SPS uplink transmissions and resources used to retransmit data according to HARQ timing. For example, the duration between TTIs designated for SPS uplink transmission may be configured to align with HARQ timing. In some examples, a first UE 115 may transmit data to a base station 105 during first TTI 305-*b*, which may be designated for an SPS uplink transmission. Subsequently, a base station 105 may unsuccessfully decode the transmission or miss the transmission completely. The base station 105 may then transmit a NACK in second TTI 310-*b* indicating that a transmission was unsuccessfully decoded or not received. Accordingly, the first UE 115 may attempt to retransmit the data during third TTI 315-*b*. Due to the alignment of SPS scheduling and HARQ timing, third TTI 315-*b* may be designated for an SPS uplink transmission. As such, the retransmission from the first UE 115 may not interfere with a transmission from a second UE 115 because the resources of third TTI 315-*b* are already allocated to the first UE 115. Aligning the SPS TTI periodicity with HARQ feedback timing may be done by a base station 105, a UE 115, or some other network entity as described herein.

FIG. 3C illustrates an example of alignment of resources scheduled for SPS uplink transmissions and resources used to retransmit data according to HARQ timing. For example, the configuration of HARQ timing may be adjusted to align with a duration between TTIs designated for SPS uplink transmission. In some examples, a first UE 115 may transmit data to a base station 105 during first TTI 305-*c*, which may be designated for an SPS uplink transmission. Subsequently, the base station 105 may unsuccessfully decode the transmission or miss the transmission completely. The base station 105 may then transmit a NACK in second TTI 310-*c* indicating that a transmission was unsuccessfully decoded or not received. Accordingly, the first UE 115 may attempt to retransmit the data during third TTI 315-*c*. Due to the alignment of HARQ timing and SPS scheduling, third TTI 315-*c* may be designated for an SPS uplink transmission. As such, the retransmission from the first UE 115 may not interfere with a transmission from a second UE 115 because the resources of third TTI 315-*c* are already allocated to the first UE 115.

Aligning the HARQ timing to the SPS TTI periodicity may be done by a base station 105, a UE 115, or some other network entity as described herein. Also, a UE 115 may transmit SPS communications according to a modified HARQ timing configured for the SPS communications, but may transmit non-SPS communications according to a different HARQ timing (e.g., an N+8 timing) configured for non-SPS uplink transmissions.

Figure 4:
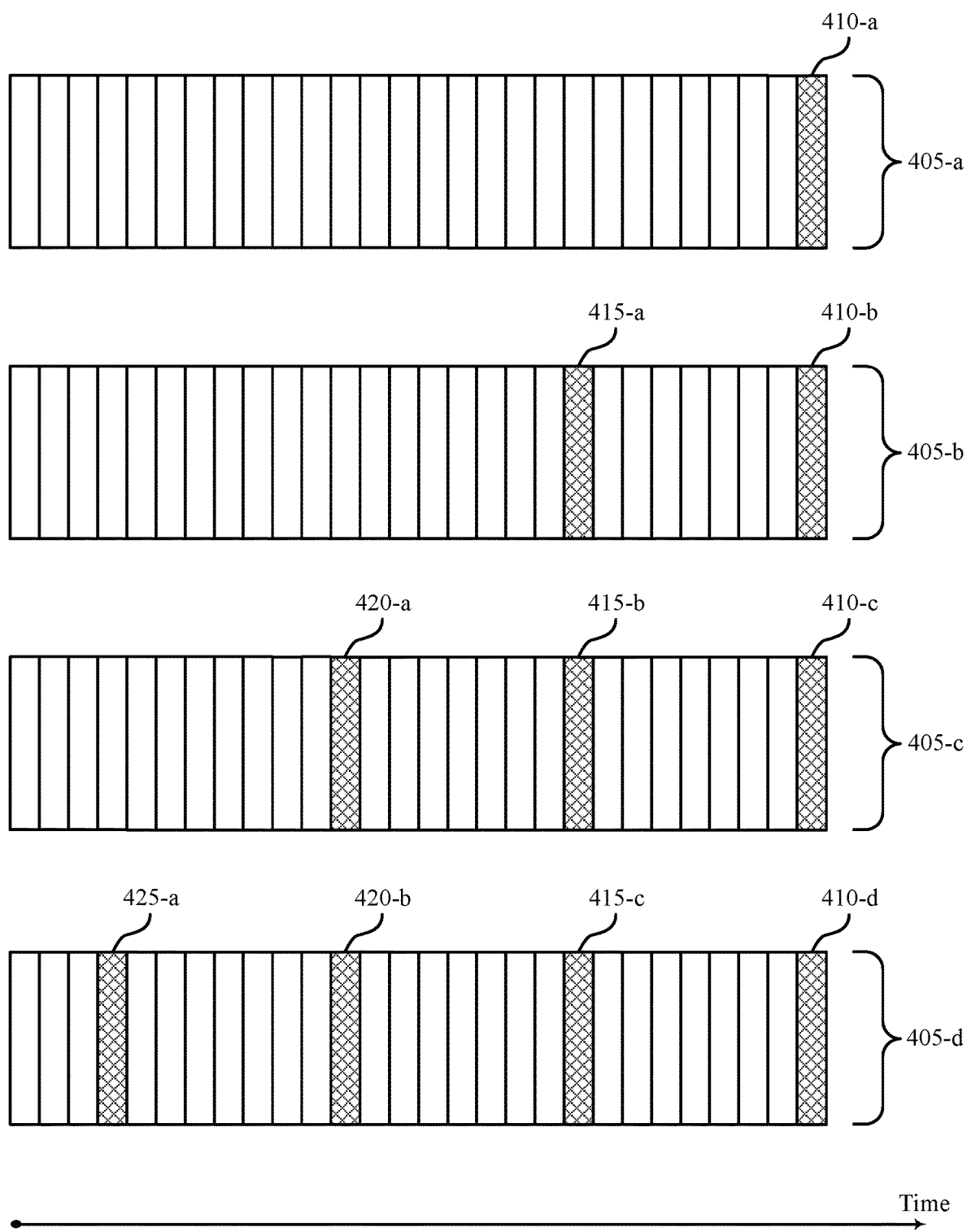
FIG. 4 illustrates an example of incremental redundancy decoding that supports uplink SPS for low latency enhancement in accordance with aspects of the present disclosure.

FIG. 4 illustrates an example of incremental redundancy techniques 400 for uplink SPS for low latency enhancement. In the example of FIG. 4, the incremental redundancy techniques may increase the chances of decoding a transmission in less retransmissions than if the redundancy versions of transmissions were not incremented.

In some cases, a first block of TTIs 405-*a* may be used for communication between a base station 105 and a UE 115. The UE 115 may transmit data during first TTI 410-*a* which may be an example of a TTI allocated for SPS uplink transmissions. After receiving the uplink message transmitted during first TTI 410-*a*, the base station 105 may decode the uplink message according to a first operation based on an assumption that the uplink message is a first transmission of the uplink message (e.g., assuming RVID0). Under this assumption, the base station 105 will attempt to decode the message without combining the message with previously received messages.

In other cases, a second block of TTIs 405-*b* may be used for communication between a base station 105 and a UE 115. UE 115 may transmit data during first TTI 410-*b* which may be an example of a TTI allocated for SPS uplink transmissions. After receiving the uplink message transmitted during first TTI 410-*b*, the base station 105 may decode the uplink message according to a second operation based on an assumption that the uplink message is a second transmission (e.g., a first retransmission) of the uplink message (e.g., assuming RVID2). As such, the base station 105 may combine data decoded from an uplink message transmitted during first TTI 410-*b* with data decoded from a previous uplink message (e.g., stored in a buffer at base station 105) transmitted during second TTI 415-*a* (e.g., 8 subframes earlier). The base station 105 may then use this information to determine additional data from the uplink message transmitted during first TTI 410-*b*.

In yet other cases, a third block of TTIs 405-*c* may be used for communication between a base station 105 and a UE 115. The UE 115 may transmit data during first TTI 410-*c* which may be an example of a TTI allocated for SPS uplink transmissions. After receiving the uplink message transmitted during first TTI 410-*c*, the base station 105 may decode the uplink message according to a third operation based on an assumption that the uplink message is a third transmission of the uplink message (e.g., assuming RVID3). As such, the base station 105 may combine data decoded from an uplink message transmitted during first TTI 410-*c* with data decoded from a previous uplink message transmitted during second TTI 415-*b* (e.g., 8 subframes earlier) and data decoded from another previous uplink message transmitted during third TTI 420-*a* (e.g., 16 subframes earlier). The base station 105 may then use this information to determine additional data from the uplink message transmitted during first TTI 410-*c*.

In yet other cases, a fourth block of TTIs 405-*d* may be used for communication between a base station 105 and a UE 115. The UE 115 may transmit data during first TTI 410-*d* which may be an example of a TTI allocated for SPS uplink transmissions. After receiving the uplink message transmitted during first TTI 410-*d*, the base station 105 may decode the uplink message according to a fourth operation based on an assumption that the uplink message is a fourth transmission of the uplink message (e.g., assuming RVID1). As such, the base station 105 may combine data decoded from an uplink message transmitted during first TTI 410-*d* with data decoded from a previous uplink message transmitted during second TTI 415-*c* (e.g., 8 subframes earlier), data decoded from another previous uplink message transmitted during third TTI 420-*b* (e.g., 16 subframes earlier), and data decoded from another previous uplink message transmitted during fourth TTI 425-*a* (e.g., 24 subframes earlier). The base station 105 may then use this information to determine additional data from the uplink message transmitted during first TTI 410-*d*.

In some cases, the four different decoding processes illustrated in FIG. 4 may be performed at a base station 105 in series or in parallel. That is, the base station 105 may attempt to decode an uplink message using a first assumption, and only attempt to decode the uplink message using a different assumption if the first decoding did not result in a successful decoding of the uplink message. In the case of parallel processing, the base station 105 may attempt to decode the uplink message using multiple assumptions about the RVID simultaneously.

In some cases, the base station 105 may determine a redundancy version of a HARQ process associated with an uplink message transmitted on a first TTI 410 based on successfully decoding the uplink message using a specific operation. For example, if the base station 105 successfully decodes an uplink message using a fourth operation, the base station 105 may determine that the transmission of the uplink message is a fourth transmission (e.g., RVID1).

In another system configuration, RVID0 may be used for all transmissions regardless of whether the transmission is a retransmission of an uplink message. As such, chase combining may be used as a method of error correction where the same information is transmitted in each retransmission. This may support an increase in the signal energy of a transmission. However, there may not be a coding gain associated with retransmissions that include the same coded bits. A coding gain may be achieved if information is transmitted with different coded bits for each retransmission (e.g., with incremental redundancy).

Figure 5:
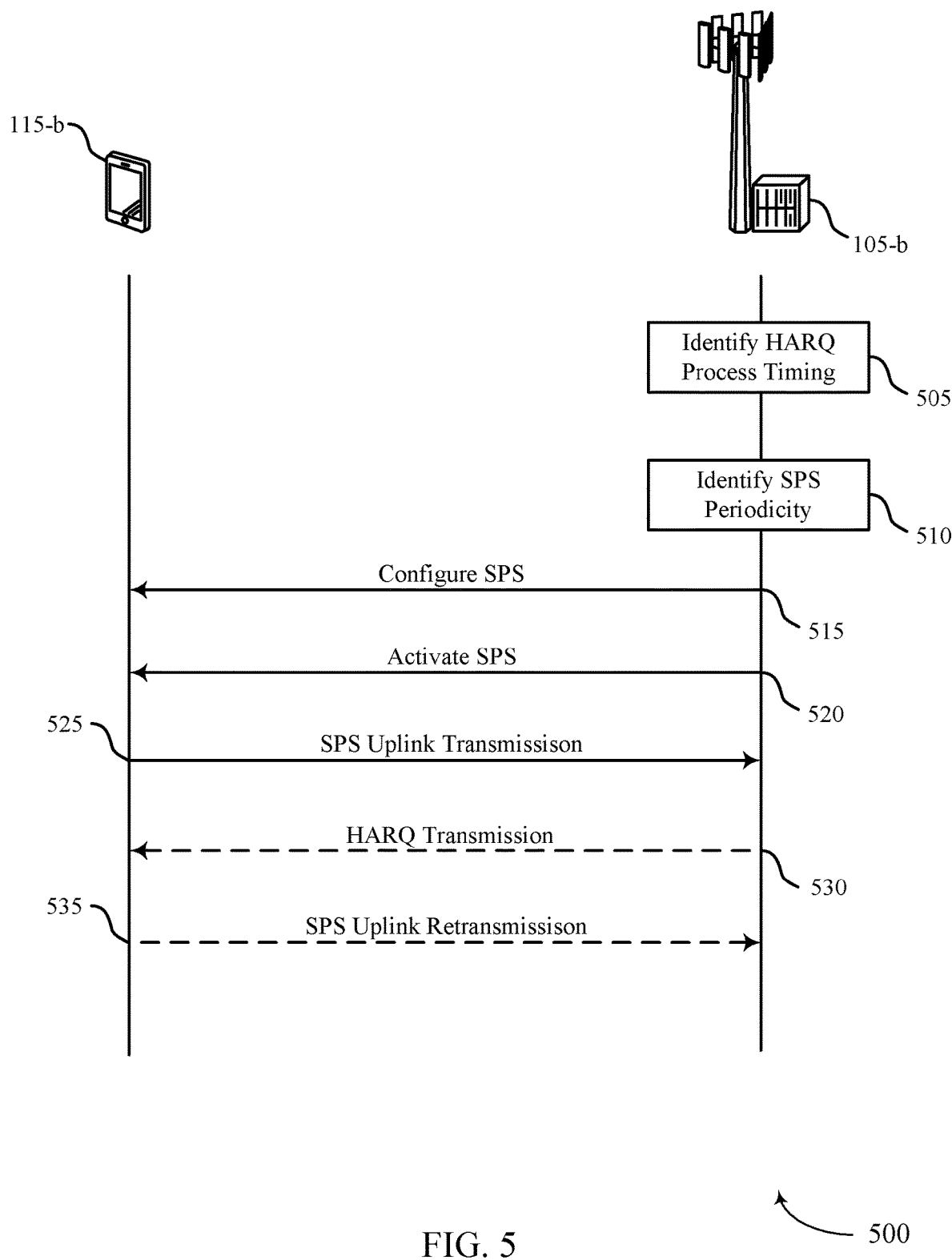
FIG. 5 illustrates an example of a process flow that supports uplink SPS for low latency enhancement in accordance with aspects of the present disclosure.

FIG. 5 illustrates an example of a process flow 500 for uplink SPS for low latency enhancement. Process flow 500 may include steps performed by UE 115-*b*, which may be an example of a UE 115 described above with reference to FIGS. 1 and 2. Process flow 500 may also include steps performed by base station 105-*b*, which may be an example of a base station 105 described above with reference to FIGS. 1 and 2.

At block 505, base station 105-*b* may identify a HARQ process timing associated with a wireless communication system (e.g., wireless communication 100 or wireless communication system 200). A HARQ process timing may include the duration (e.g., measured in TTIs) that it takes for base station 105-*b* to respond with HARQ feedback to a message sent from UE 115-*b* and for UE 115-*b* to respond with a retransmission (if needed). In some cases, the HARQ process timing may include a duration of eight (8) TTIs between a transmission and a retransmission. As described herein, a HARQ process timing may be configured by base station 105-*b* or another network entity, and may be static or may be adjusted to align with SPS uplink transmissions.

At block 510, base station 105-b may identify a duration between TTIs designated for SPS uplink transmission (i.e., an SPS periodicity). In some cases, the duration between the TTIs designated for the SPS uplink transmissions may include a duration of ten TTIs. As described herein, an SPS periodicity may be configured by base station 105-b or another network entity, and may be static or may be adjusted to align with HARQ process timing.

At step 515, base station 105-b may then configure UE 115-b or a carrier associated with UE 115-b for SPS by designating TTIs and frequency resources for periodic uplink transmissions from UE 115-b. This configuration may be indicated by base station 105-b using RRC signaling (e.g., in an SPS-config message). In some cases, the periodicity of resource allocations or the duration between TTIs designated for SPS uplink transmissions may be included in the configuration. A schedule for the SPS uplink transmissions may be based on the HARQ process timing identified at block 505 or the duration between the TTIs designated for the SPS uplink transmissions identified at block 510.

In some cases, the HARQ process timing may be configured based on the duration between TTIs designated for uplink transmissions identified at block 510. Accordingly, the SPS configuration may support retransmission of an uplink message according to the HARQ process timing during a TTI designated for the SPS uplink transmissions. Base station 105-b may also configure a second HARQ process timing for uplink transmissions other than the SPS uplink transmissions.

In other cases, the periodicity of resource allocations or the duration between TTIs designated for SPS uplink transmission may be configured based on a HARQ process timing identified at block 505. Accordingly, the SPS configuration may support retransmission of an uplink message according to the HARQ process timing during a TTI designated for the SPS uplink transmissions.

At step 520, base station 105-b may then activate SPS to allow UE 115-b to transmit on the uplink using the allocated SPS resources. In some cases, base station 105-b may signal the SPS activation using an SPS scheduling grant.

At step 525, UE 115-b may transmit and base station 105-b may receive an uplink message during a first TTI designated for the SPS uplink transmissions according to the schedule included in the configuration at step 515.

At step 530, base station 105-b may then transmit a NACK on a physical HARQ indicator channel (PHICH). In some cases, instead of receiving a NACK, UE 115-b may declare (or otherwise determine) that the message was not received by base station 105-b.

At step 535, UE 115-b may then retransmit the data during a second TTI designated for the SPS uplink transmissions. In some cases, the timing of the retransmission may be based on the schedule included in the configuration or a HARQ timing identified at step 515. That is, the retransmission may be scheduled to occur during resources designated for SPS uplink transmissions, as described in FIG. 3.

Figure 6:
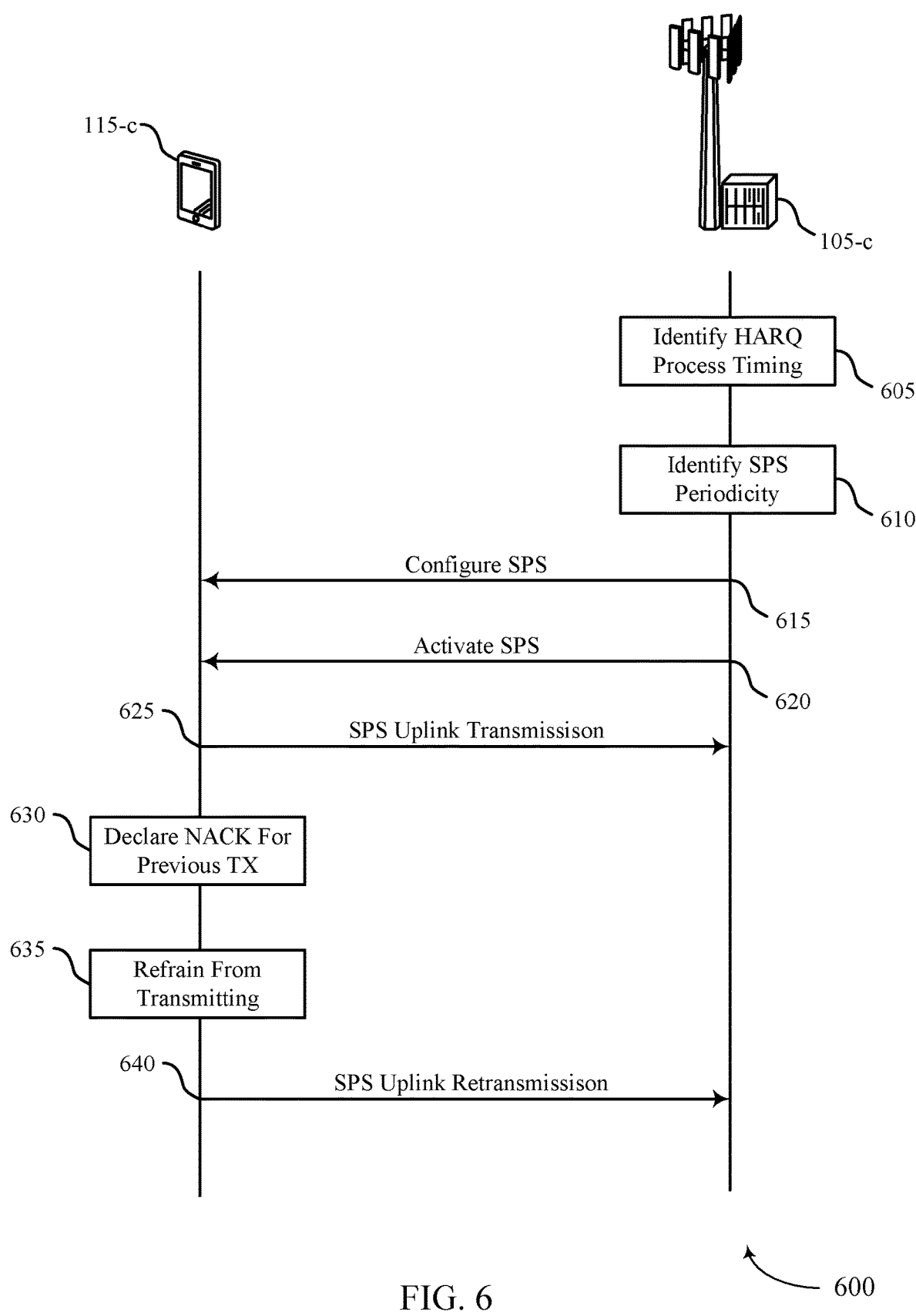
FIG. 6 illustrates an example of a process flow that supports uplink SPS for low latency enhancement in accordance with aspects of the present disclosure.

FIG. 6 illustrates an example of a process flow 600 for uplink SPS for low latency enhancement. Process flow 600 may include steps performed by UE 115-c, which may be an example of a UE 115 described above with reference to FIGS. 1 and 2. Process flow 600 may also include steps performed by base station 105-c, which may be an example of a base station 105 described above with reference to FIGS. 1 and 2. Process flow 600 may be an example of the SPS and HARQ timing scheduling methods described above with reference to FIG. 3.

At block 605, base station 105-c may identify a HARQ process timing associated with a wireless communication system (e.g., wireless communication 100 or wireless communication system 200). In some cases, the HARQ process timing may include a duration of eight TTIs between a transmission and a retransmission.

At block 610, base station 105-c may identify a duration between TTIs designated for SPS uplink transmission (i.e., an SPS periodicity). In some cases, the duration between the TTIs designated for the SPS uplink transmissions may include a duration of ten TTIs.

At step 615, base station 105-c may configure UE 115-c or a carrier associated with UE 115-c for SPS by designating TTIs and frequency resources for periodic uplink transmissions from UE 115-c. In some cases, this configuration may be indicated by base station 105-c using RRC signaling (e.g., in an SPS-config message). Additionally, the configuration may include an indication of a schedule for a plurality of TTIs designated for SPS uplink transmissions.

At step 620, base station 105-c may then activate SPS to allow UE 115-c to transmit on the uplink using the allocated SPS resources.

At step 625, UE 115-c may transmit an uplink message on a first TTI of the plurality of TTIs designated for the SPS uplink transmission. Base station 105-c may unsuccessfully decode the uplink message transmitted during the first TTI of the plurality of TTIs designated for SPS uplink transmissions. In some cases, the unsuccessfully decoding the uplink message may include not receiving the uplink message.

At block 630, UE 115-c may then determine that the uplink message was unsuccessfully decoded based on an absence of signaling in a downlink TTI that is designated for HARQ feedback according to a HARQ process timing. Accordingly, UE 115-c may declare a NACK for a data transmitted at step 625.

At block 635, UE 115-c may refrain from retransmitting the uplink message in a first uplink TTI that is designated for retransmission according to the HARQ process timing. In some cases, the plurality of TTIs designated for the SPS uplink transmission may exclude the first uplink TTI. That is, UE 115-c may refrain from retransmitting the uplink message during non-SPS TTIs, even if these non-SPS TTIs are scheduled for (or otherwise available to) UE 115-c for uplink retransmissions.

At step 640, UE 115-c may then retransmit the uplink message in a second uplink TTI of the plurality of TTIs designated for the SPS uplink transmissions.

Figure 7:
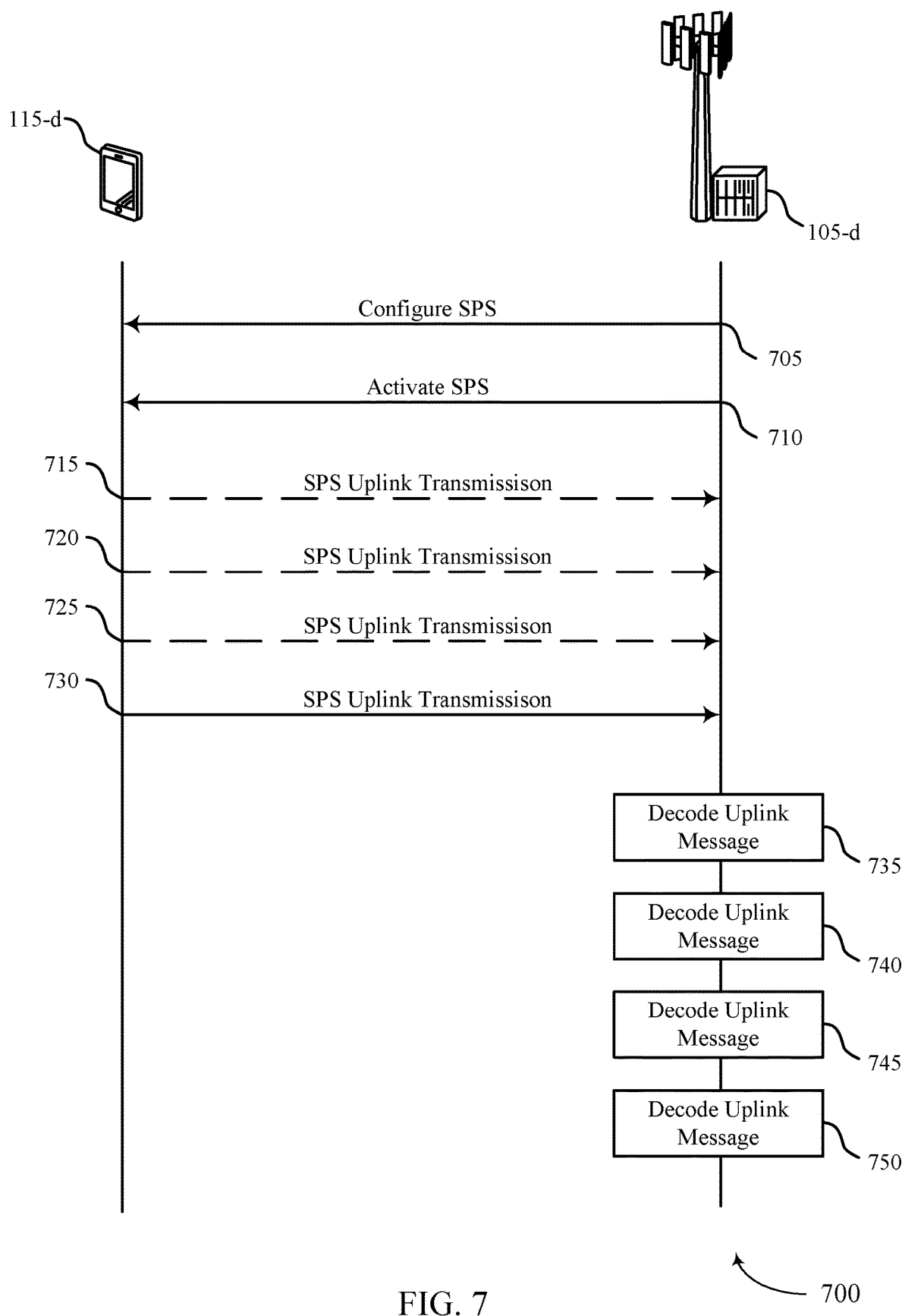
FIG. 7 illustrates an example of a process flow that supports uplink SPS for low latency enhancement in accordance with aspects of the present disclosure.

FIG. 7 illustrates an example of a process flow 700 for uplink SPS for low latency enhancement. Process flow 700 may include steps performed by UE 115-d, which may be an example of a UE 115 described above with reference to FIGS. 1 and 2. Process flow 700 may also include steps performed by base station 105-d, which may be an example of a base station 105 described above with reference to FIGS. 1 and 2. Process flow 700 may be an example of the multiple hypotheses RVID decoding methods described above with reference to FIG. 4.

At step 705, base station 105-d may configure UE 115-d or a carrier associated with UE 115-d for SPS by designating TTIs and frequency resources for periodic uplink transmissions from UE 115-d. In some cases, this configuration may be indicated by base station 105-d using RRC signaling (e.g., in an SPS-config message).

At step 710, base station 105-d may then activate SPS to allow UE 115-d to transmit on the uplink using the allocated SPS resources.

At step 715, UE 115-*d* may transmit and base station 105-*d* may receive a uplink message on the configured carrier during a TTI designated for the SPS uplink transmission. Base station 105-*d* may then attempt to decode the uplink message. In some cases, base station 105-*d* may fail to fully decode the uplink message, and base station 105-*d* may save a successfully decoded portion of the uplink message in a buffer.

At step 720, UE 115-*d* may transmit and base station 105-*d* may receive a uplink message on the configured carrier during a TTI designated for the SPS uplink transmission. Base station 105-*d* may then attempt to decode the uplink message. In some cases, base station 105-*d* may fail to fully decode the uplink message, and base station 105-*d* may save a successfully decoded portion of the uplink message in a buffer.

At step 725, UE 115-*d* may transmit and base station 105-*d* may receive a uplink message on the configured carrier during a TTI designated for the SPS uplink transmission. Base station 105-*d* may then attempt to decode the uplink message. In some cases, base station 105-*d* may fail to fully decode the uplink message, and base station 105-*d* may save a successfully decoded portion of the uplink message in a buffer.

At step 730, UE 115-*d* may transmit and base station 105-*d* may receive a uplink message on the configured carrier during a TTI designated for the SPS uplink transmission. Base station 105-*d* may then attempt to decode the uplink message. In some cases, base station 105-*d* may fail to fully decode the uplink message, and base station 105-*d* may save a successfully decoded portion of the uplink message in a buffer.

The dotted lines illustrated in steps 715, 720, and 725 indicate that receiving and failing to decode these messages are optional steps in the process described below. That is, in some cases, none of these messages are received prior to receiving the message at step 730, and in other cases some or all of the messages are received prior to receiving the message at step 730.

At block 735, base station 105-*d* may decode the uplink message received at step 730 according to a first operation. In some cases, base station 105-*d* may decode the uplink message based on an assumption that the uplink message is a first transmission of the uplink message (e.g., assuming RVID0). Base station 105-*d* may also determine a redundancy version of a HARQ process of the uplink message based on decoding the uplink message according to the first operation.

At block 740, base station 105-*d* may decode the uplink message received at step 730 according to a second operation. In some cases, base station 105-*d* may decode the uplink message based on an assumption that the uplink message is a second transmission (e.g., a first retransmission) of the uplink message (e.g., assuming RVID2). The second operation may include combining the uplink message received at step 730 with at least one prior uplink message received at a predetermined number of TTIs before the uplink message. For example, the uplink message received at step 730 may be combined with an uplink message received at step 725. In some examples, the predetermined number of TTIs may include a multiple of eight (8) TTIs. Base station 105-*d* may also determine a redundancy version of a HARQ process of the uplink message based on decoding the uplink message according to the first operation. Base station 105-*d* may also determine a redundancy version of a HARQ process of the uplink message based on decoding the uplink message according to the second operation.

At block 745, base station 105-*d* may decode the uplink message received at step 730 according to a third operation. In some cases, base station 105-*d* may decode the uplink message based on an assumption that the uplink message is a third transmission of the uplink message (e.g., assuming RVID3). The third operation may include combining the uplink message received at step 730 with at least one prior uplink message received at a predetermined number of TTIs before the uplink message. For example, the uplink message received at step 730 may be combined with an uplink message received at step 725 and an uplink message received at step 720. In some examples, the predetermined number of TTIs may include a multiple of eight (8) TTIs. Base station 105-*d* may also determine a redundancy version of a HARQ process of the uplink message based on decoding the uplink message according to the third operation.

At block 750, base station 105-*d* may decode the uplink message received at step 730 according to a fourth operation. In some cases, base station 105-*d* may decode the uplink message based on an assumption that the uplink message is a fourth transmission of the uplink message (e.g., assuming RVID1). The fourth operation may include combining the uplink message received at step 730 with at least one prior uplink message received at a predetermined number of TTIs before the uplink message. For example, the uplink message received at step 730 may be combined with an uplink message received at step 725, an uplink message received at step 720, and an uplink message received at step 715. In some examples, the predetermined number of TTIs may include a multiple of eight (8) TTIs. Base station 105-*d* may also determine a redundancy version of a HARQ process of the uplink message based on decoding the uplink message according to the fourth operation.

Figure 8:
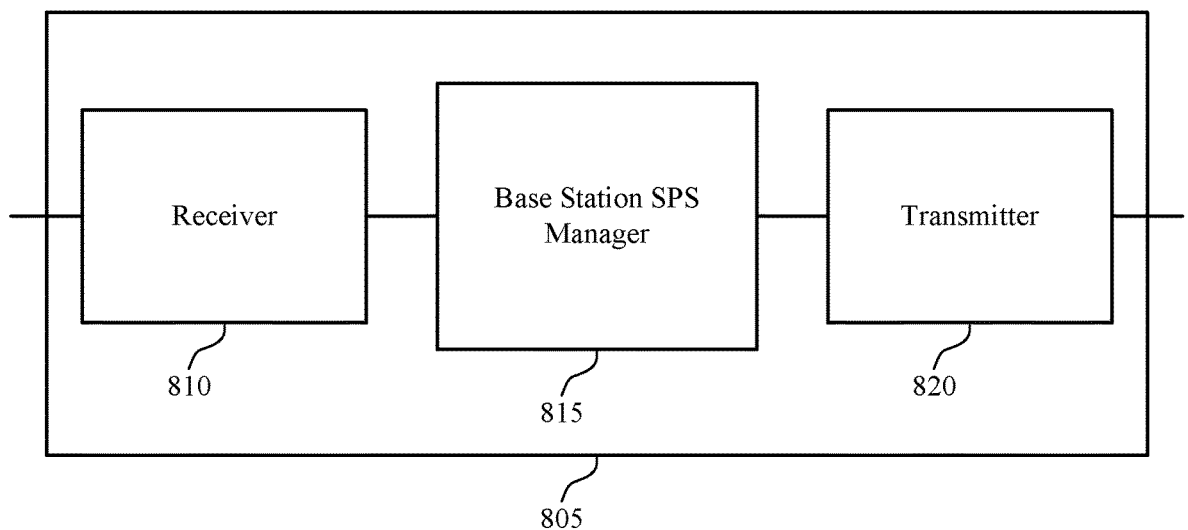
FIGS. 8 through 10 show block diagrams of a device that supports uplink SPS for low latency enhancement in accordance with aspects of the present disclosure.

FIG. 8 shows a block diagram 800 of a wireless device 805 that supports uplink SPS for low latency enhancement in accordance with various aspects of the present disclosure. Wireless device 805 may be an example of aspects of a base station 105 as described with reference to FIG. 1. Wireless device 805 may include receiver 810, base station SPS manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to uplink SPS for low latency enhancement, etc.). Information may be passed on to other components of the device. The receiver 810 may be an example of aspects of the transceiver 1135 described with reference to FIG. 11.

Base station SPS manager 815 may be an example of aspects of a base station SPS manager 915, a base station SPS manager 1015, or a base station SPS manager 1115, described with reference to FIGS. 9, 10, and 11.

Base station SPS manager 815 may identify a hybrid automatic repeat request (HARQ) process timing, identify a duration between TTIs designated for semi-persistent SPS uplink transmissions, configure a carrier for the SPS uplink transmissions, where a schedule for the SPS uplink transmissions is based on the HARQ process timing and the duration between the TTIs designated for the SPS uplink transmissions, and transmit signaling that indicates the carrier configuration and the schedule for the SPS uplink transmissions. The base station SPS manager 815 may also identify a HARQ process timing, configure a carrier for SPS uplink transmissions with a set of TTIs designated for the SPS uplink transmissions, unsuccessfully decode an uplink message transmitted during a first TTI of the set of TTIs designated for the SPS uplink transmissions, and receive a retransmission of the uplink message during a second TTI of the set of TTIs designated for the SPS uplink transmissions, where the carrier is configured with a first uplink TTI that precedes the second TTI of the set of TTIs designated for the SPS uplink transmissions and the first uplink TTI is designated for the retransmission of the uplink message according to the HARQ process timing.

The base station SPS manager 815 may also configure a carrier for SPS uplink transmissions, receive an uplink message during a TTI designated for the SPS uplink transmissions, decode the uplink message according to a first operation that is based on an assumption that the uplink message is a first transmission of the uplink message, and decode the uplink message according to a second operation that is based on an assumption that the uplink message is a second transmission of the uplink message, where the second operation includes combining the uplink message with at least one prior uplink message received at a predetermined number of TTIs before the uplink message.

Transmitter 820 may transmit signals generated by other components of the device. In some examples, the transmitter 820 may be collocated with a receiver 810 in a transceiver module. For example, the transmitter 820 may be an example of aspects of the transceiver 1135 described with reference to FIG. 11. The transmitter 820 may include a single antenna, or it may include a set of antennas.

Figure 9:
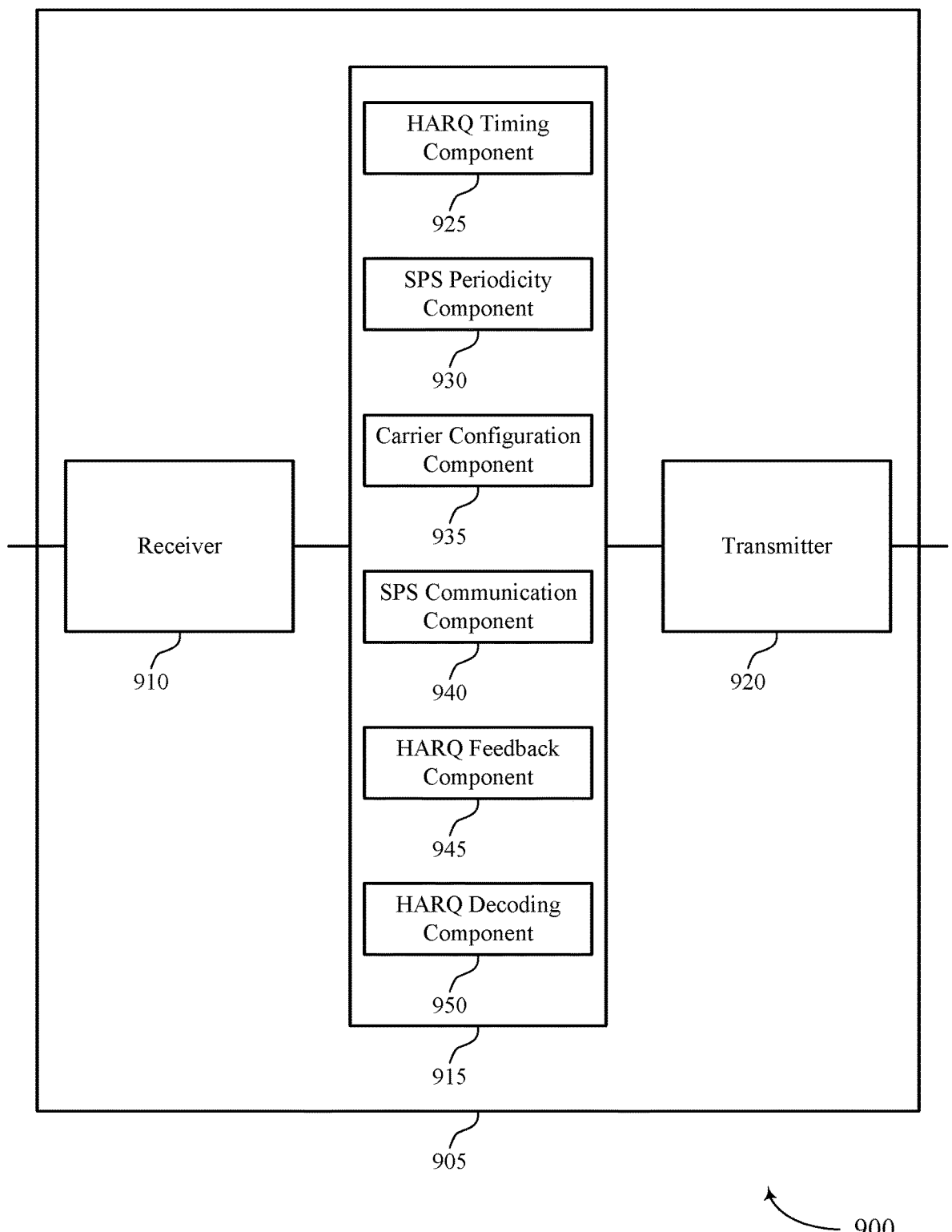

FIG. 9 shows a block diagram 900 of a wireless device 905 that supports uplink SPS for low latency enhancement in accordance with various aspects of the present disclosure. Wireless device 905 may be an example of aspects of a wireless device 805 or a base station 105 as described with reference to FIGS. 1 and 8. Wireless device 905 may include receiver 910, base station SPS manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to uplink SPS for low latency enhancement, etc.). Information may be passed on to other components of the device. The receiver 910 may be an example of aspects of the transceiver 1135 described with reference to FIG. 11.

Base station SPS manager 915 may be an example of aspects of a base station SPS manager 815, a base station SPS manager 1015, or a base station SPS manager 1115, described with reference to FIGS. 8, 10, and 11.

Base station SPS manager 915 may also include HARQ timing component 925, SPS periodicity component 930, carrier configuration component 935, SPS communication component 940, HARQ feedback component 945, and HARQ decoding component 950.

HARQ timing component 925 may identify a HARQ process timing, configure the HARQ process timing based on the duration between TTIs designated for the SPS uplink transmissions, and configure a second HARQ process timing for uplink transmissions other than the SPS uplink transmissions. In some cases, the duration between TTIs designated for the SPS uplink transmissions is configured to support retransmission of an uplink message according to the HARQ process timing during a TTI designated for the SPS uplink transmissions. In some cases, the duration between the TTIs designated for the SPS uplink transmissions includes a duration of ten TTIs.

SPS periodicity component 930 may identify a duration between TTIs designated for SPS uplink transmissions and configure the duration between TTIs designated for the SPS uplink transmissions based on the HARQ process timing. In some cases, the duration between TTIs designated for the SPS uplink transmissions is configured to support retransmission of an uplink message according to the HARQ process timing during a TTI designated for the SPS uplink transmissions. In some cases, the HARQ process timing includes a duration of eight TTIs between a transmission and a retransmission.

Carrier configuration component 935 may configure a carrier for the SPS uplink transmissions, where a schedule for the SPS uplink transmissions is based on the HARQ process timing and the duration between the TTIs designated for the SPS uplink transmissions.

SPS communication component 940 may transmit signaling that indicates the carrier configuration and the schedule for the SPS uplink transmissions, receive an uplink message during a first TTI designated for the SPS uplink transmissions according to the schedule, receive a retransmission of the uplink message on a second TTI designated for the SPS uplink transmissions, where a timing of the retransmission is based on the schedule and the HARQ process timing, receive a retransmission of the uplink message during a second TTI of the set of TTIs designated for the SPS uplink transmissions, where the carrier is configured with a first uplink TTI that precedes the second TTI of the set of TTIs designated for the SPS uplink transmissions and the first uplink TTI is designated for the retransmission of the uplink message according to the HARQ process timing, and receive an uplink message during a TTI designated for the SPS uplink transmissions.

HARQ feedback component 945 may unsuccessfully decode an uplink message transmitted during a first TTI of the set of TTIs designated for the SPS uplink transmissions.

HARQ decoding component 950 may decode the uplink message according to a first operation that is based on an assumption that the uplink message is a first transmission of the uplink message, decode the uplink message according to a second operation that is based on an assumption that the uplink message is a second transmission of the uplink message, where the second operation includes combining the uplink message with at least one prior uplink message received at a predetermined number of TTIs before the uplink message, decode the uplink message according to a third operation that is based on an assumption that the uplink message is a third transmission of the uplink message, where the third operation includes combining the uplink message with at least two prior uplink messages each received at a predetermined number of TTIs before the uplink message, and decode the uplink message according to a fourth operation that is based on an assumption that the uplink message is a fourth transmission of the uplink message, where the fourth operation includes combining the uplink message with at least three prior uplink messages each received at a predetermined number of TTIs before the uplink message. In some cases, the predetermined number of TTIs includes a multiple of eight TTIs.

Transmitter 920 may transmit signals generated by other components of the device. In some examples, the transmitter 920 may be collocated with a receiver 910 in a transceiver module. For example, the transmitter 920 may be an example of aspects of the transceiver 1135 described with reference to FIG. 11. The transmitter 920 may include a single antenna, or it may include a set of antennas.

Figure 10:
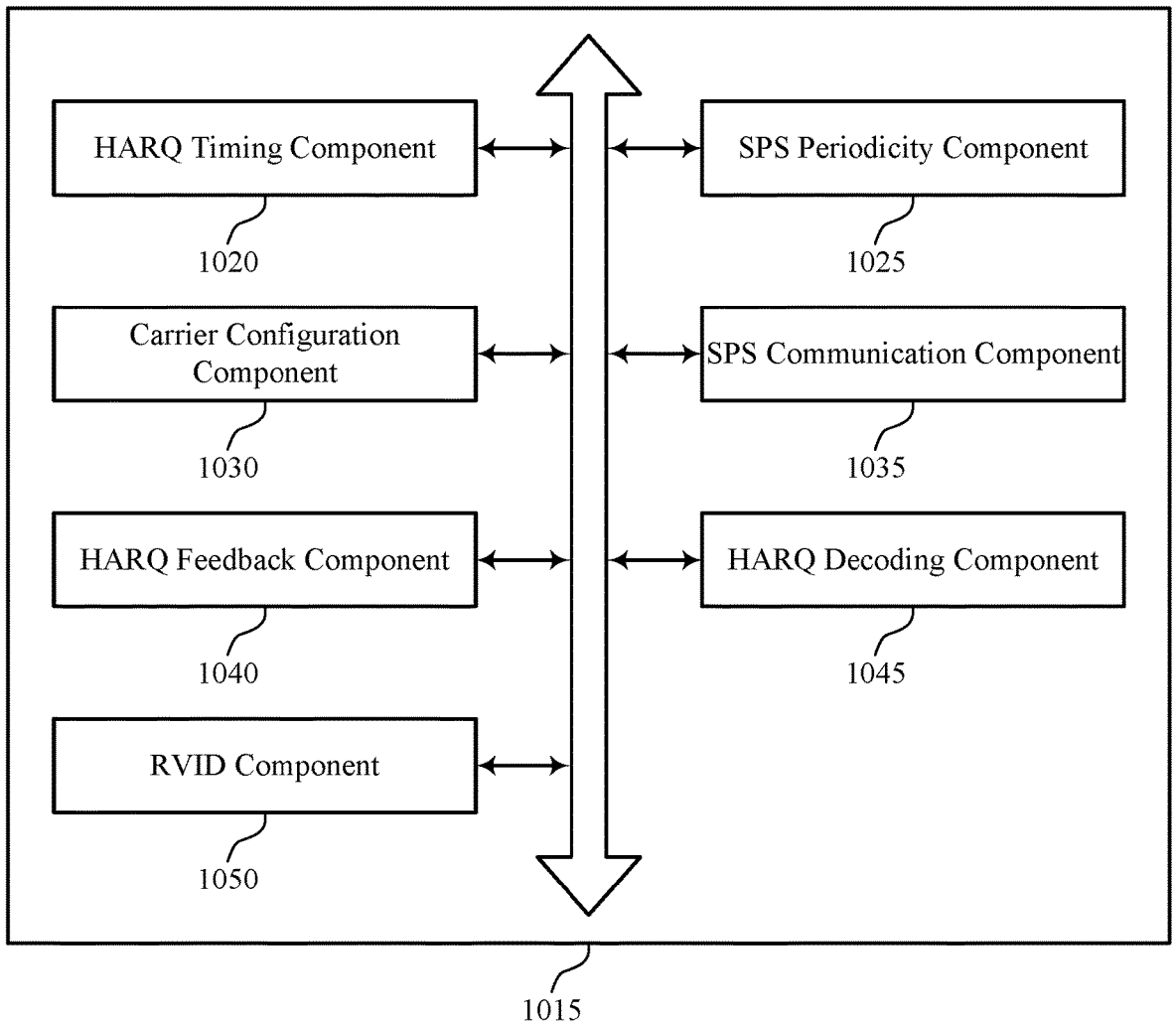

FIG. 10 shows a block diagram 1000 of a base station SPS manager 1015 that supports uplink SPS for low latency enhancement in accordance with various aspects of the present disclosure. The base station SPS manager 1015 may be an example of aspects of a base station SPS manager 815, a base station SPS manager 915, or a base station SPS manager 1115 described with reference to FIGS. 8, 9, and 11. The base station SPS manager 1015 may include HARQ timing component 1020, SPS periodicity component 1025, carrier configuration component 1030, SPS communication component 1035, HARQ feedback component 1040, HARQ decoding component 1045, and RVID component 1050. Each of these modules may communicate, directly or indirectly, with one another (e.g., via one or more buses).

HARQ timing component 1020 may identify a HARQ process timing, configure the HARQ process timing based on the duration between TTIs designated for the SPS uplink transmissions, and configure a second HARQ process timing for uplink transmissions other than the SPS uplink transmissions. In some cases, the duration between TTIs designated for the SPS uplink transmissions is configured to support retransmission of an uplink message according to the HARQ process timing during a TTI designated for the SPS uplink transmissions. In some cases, the duration between the TTIs designated for the SPS uplink transmissions includes a duration of ten TTIs.

SPS periodicity component 1025 may identify a duration between TTIs designated for SPS uplink transmissions and configure the duration between TTIs designated for the SPS uplink transmissions based on the HARQ process timing. In some cases, the duration between TTIs designated for the SPS uplink transmissions is configured to support retransmission of an uplink message according to the HARQ process timing during a TTI designated for the SPS uplink transmissions. In some cases, the HARQ process timing includes a duration of eight TTIs between a transmission and a retransmission.

Carrier configuration component 1030 may configure a carrier for the SPS uplink transmissions, where a schedule for the SPS uplink transmissions is based on the HARQ process timing and the duration between the TTIs designated for the SPS uplink transmissions.

SPS communication component 1035 may transmit signaling that indicates the carrier configuration and the schedule for the SPS uplink transmissions, receive an uplink message during a first TTI designated for the SPS uplink transmissions according to the schedule, receive a retransmission of the uplink message on a second TTI designated for the SPS uplink transmissions, where a timing of the retransmission is based on the schedule and the HARQ process timing, receive a retransmission of the uplink message during a second TTI of the set of TTIs designated for the SPS uplink transmissions, where the carrier is configured with a first uplink TTI that precedes the second TTI of the set of TTIs designated for the SPS uplink transmissions and the first uplink TTI is designated for the retransmission of the uplink message according to the HARQ process timing, and receive an uplink message during a TTI designated for the SPS uplink transmissions.

HARQ feedback component 1040 may unsuccessfully decode an uplink message transmitted during a first TTI of the set of TTIs designated for the SPS uplink transmissions and unsuccessfully decode the uplink message transmitted during the first TTI of the set of TTIs designated for the SPS uplink transmissions includes not receiving the uplink message.

HARQ decoding component 1045 may decode the uplink message according to a first operation that is based on an assumption that the uplink message is a first transmission of the uplink message, decode the uplink message according to a second operation that is based on an assumption that the uplink message is a second transmission of the uplink message, where the second operation includes combining the uplink message with at least one prior uplink message received at a predetermined number of TTIs before the uplink message, decode the uplink message according to a third operation that is based on an assumption that the uplink message is a third transmission of the uplink message, where the third operation includes combining the uplink message with at least two prior uplink messages each received at a predetermined number of TTIs before the uplink message, and decode the uplink message according to a fourth operation that is based on an assumption that the uplink message is a fourth transmission of the uplink message, where the fourth operation includes combining the uplink message with at least three prior uplink messages each received at a predetermined number of TTIs before the uplink message. In some cases, the predetermined number of TTIs includes a multiple of eight TTIs.

RVID component 1050 may determine a redundancy version of a HARQ process of the uplink message based on decoding the uplink message according to the first operation and decoding the uplink message according to the second operation.

Figure 11:
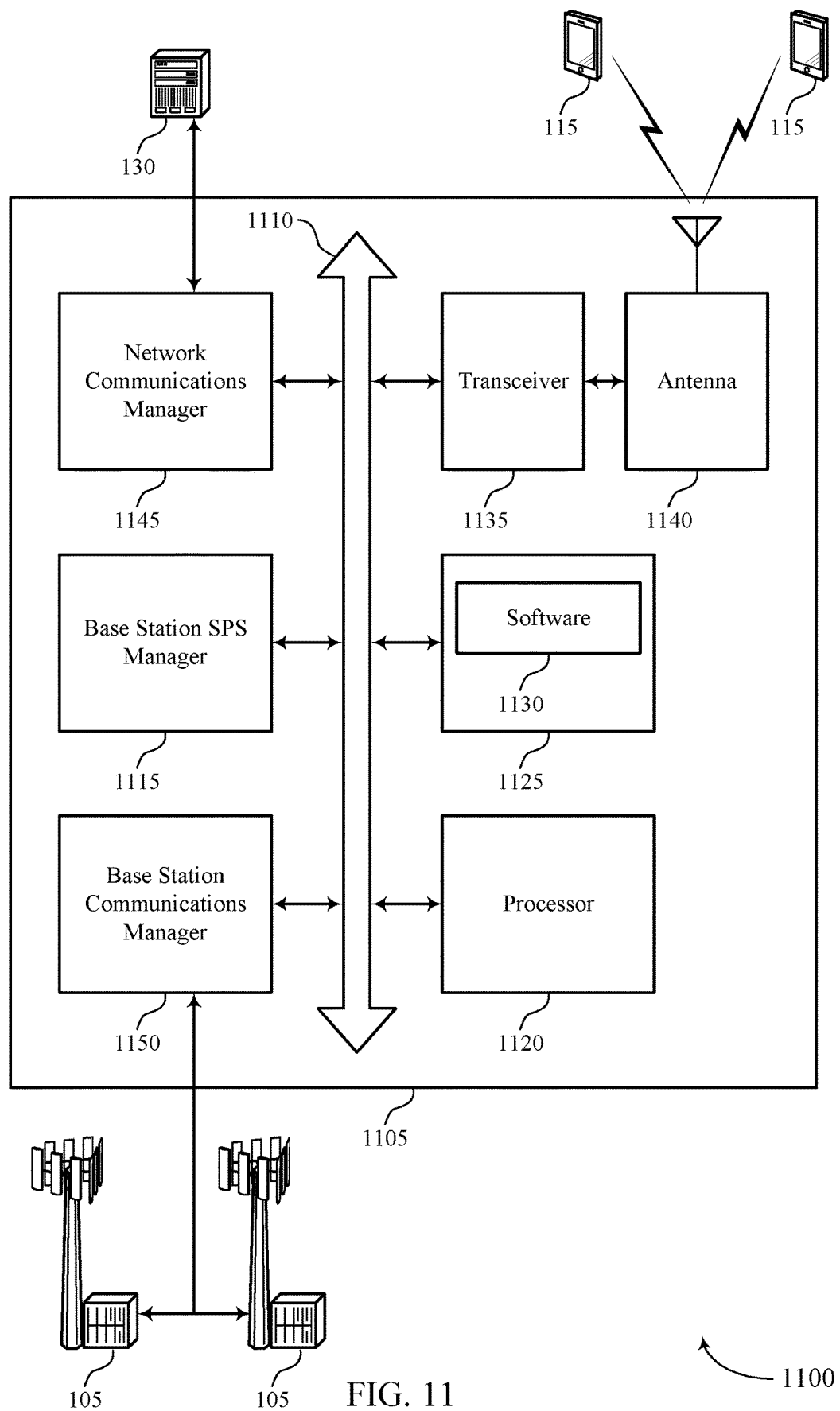
FIG. 11 illustrates a block diagram of a system including a base station that supports uplink SPS for low latency enhancement in accordance with aspects of the present disclosure.

FIG. 11 shows a diagram of a system 1100 including a device 1105 that supports uplink SPS for low latency enhancement in accordance with various aspects of the present disclosure. Device 1105 may be an example of or include the components of wireless device 805, wireless device 905, or a base station 105 as described above, e.g., with reference to FIGS. 1, 8 and 9. Device 1105 may include components for bi-directional voice and data communications including components for transmitting and receiving communications, including base station SPS manager 1115, processor 1120, memory 1125, software 1130, transceiver 1135, antenna 1140, network communications manager 1145, and base station communications manager 1150. These components may be in electronic communication via one or more busses (e.g., bus 1110). Device 1105 may communicate wirelessly with one or more user equipment (UE)s 115.

Processor 1120 may include an intelligent hardware device, (e.g., a general-purpose processor, a digital signal processor (DSP), a central processing unit (CPU), a microcontroller, an application-specific integrated circuit (ASIC), an field-programmable gate array (FPGA), a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting uplink SPS for low latency enhancement).

Memory 1125 may include random access memory (RAM) and read only memory (ROM). The memory 1125 may store computer-readable, computer-executable software 1130 including instructions that, when executed, cause the processor to perform various functions described herein. In some cases, the memory 1125 may contain, among other things, a basic input/output system (BIOS) which may control basic hardware and/or software operation such as the interaction with peripheral components or devices.

Software 1130 may include code to implement aspects of the present disclosure, including code to support uplink SPS for low latency enhancement. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas.

In some cases, the wireless device may include a single antenna 1140. However, in some cases the device may have more than one antenna 1140, which may be capable of concurrently transmitting or receiving multiple wireless transmissions.

Network communications manager 1145 may manage communications with the core network (e.g., via one or more wired backhaul links). For example, the network communications manager 1145 may manage the transfer of data communications for client devices, such as one or more UEs 115.

Base station communications manager 1150 may manage communications with other base station 105, and may include a controller or scheduler for controlling communications with UEs 115 in cooperation with other base stations 105. For example, the base station communications manager 1150 may coordinate scheduling for transmissions to UEs 115 for various interference mitigation techniques such as beamforming or joint transmission. In some examples, base station communications manager 1150 may provide an X2 interface within an Long Term Evolution (LTE)/LTE-A wireless communication network technology to provide communication between base stations 105.

Figure 12:
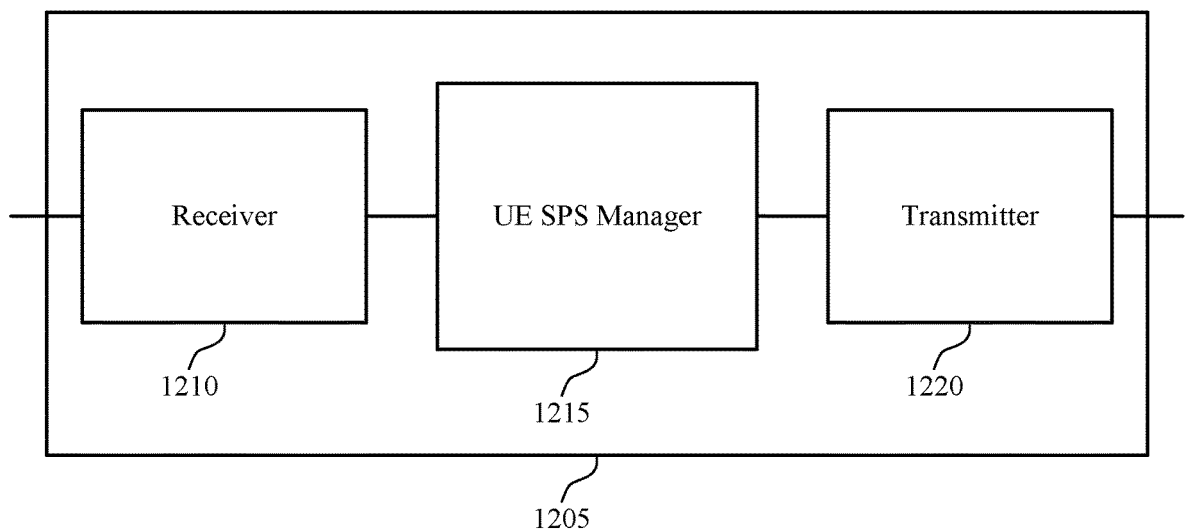
FIGS. 12 through 14 show block diagrams of a device that supports uplink SPS for low latency enhancement in accordance with aspects of the present disclosure.

FIG. 12 shows a block diagram 1200 of a wireless device 1205 that supports uplink SPS for low latency enhancement in accordance with various aspects of the present disclosure. Wireless device 1205 may be an example of aspects of a UE 115 as described with reference to FIG. 1. Wireless device 1205 may include receiver 1210, UE SPS manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to uplink SPS for low latency enhancement, etc.). Information may be passed on to other components of the device. The receiver 1210 may be an example of aspects of the transceiver 1535 described with reference to FIG. 15.

UE SPS manager 1215 may be an example of aspects of a UE SPS manager 1315, a UE SPS manager 1415, or a UE SPS manager 1515 described with reference to FIG. 13, 14, or 15.

UE SPS manager 1215 may receive signaling that indicates that a carrier is configured for SPS uplink transmissions, where a schedule for the SPS uplink transmissions is based on a HARQ process timing and a duration between TTIs designated for the SPS uplink transmissions, determine the duration between the TTIs designated for the SPS uplink transmissions based on the signaling, and communicate with a base station 105 during the TTIs designated for the SPS uplink transmissions according to the schedule for the SPS uplink transmissions and the HARQ process timing. The UE SPS manager 1215 may also receive signaling that indicates that a carrier is configured for SPS uplink transmissions, where the signaling indicates a schedule for a set of TTIs designated for the SPS uplink transmissions, transmit an uplink message on a first TTI of the set of TTIs designated for the SPS uplink transmissions, determine that the uplink message was unsuccessfully decoded based on an absence of signaling in a downlink TTI that is designated for HARQ feedback according to a HARQ process timing, refrain from retransmitting the uplink message in a first uplink TTI that is designated for retransmission according to the HARQ process timing, where the set of TTIs designated for the SPS uplink transmissions excludes the first uplink TTI, and retransmit the uplink message in a second uplink TTI of the set of TTIs designated for the SPS uplink transmissions.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1535 described with reference to FIG. 15. The transmitter 1220 may include a single antenna, or it may include a set of antennas.

Figure 13:
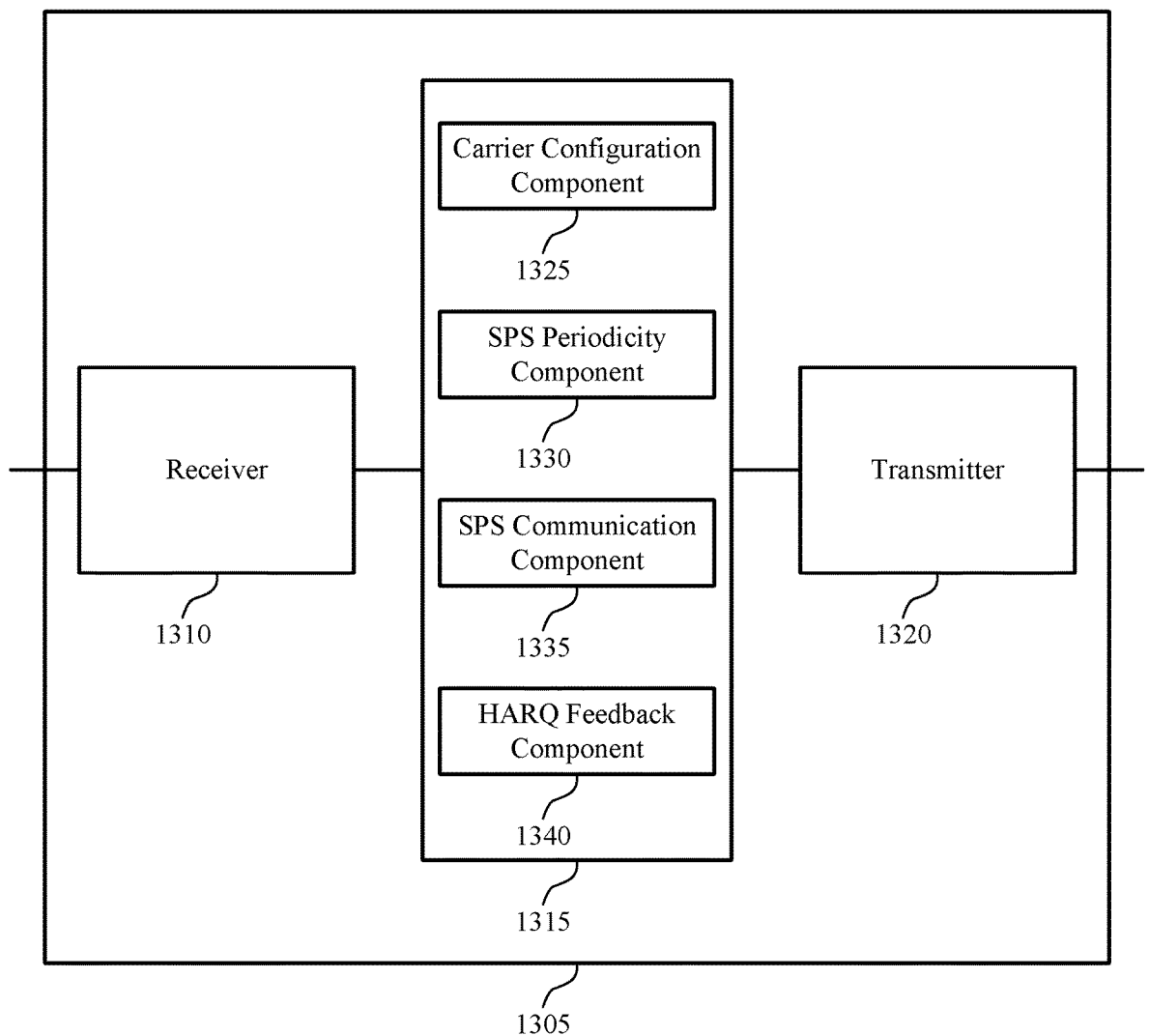

FIG. 13 shows a block diagram 1300 of a wireless device 1305 that supports uplink SPS for low latency enhancement in accordance with various aspects of the present disclosure. Wireless device 1305 may be an example of aspects of a wireless device 1205 or a UE 115 as described with reference to FIGS. 1 and 12. Wireless device 1305 may include receiver 1310, UE SPS manager 1315, and transmitter 1320. Wireless device 1305 may also include a processor. Each of these components may be in communication with one another (e.g., via one or more buses).

Receiver 1310 may receive information such as packets, user data, or control information associated with various information channels (e.g., control channels, data channels, and information related to uplink SPS for low latency enhancement, etc.). Information may be passed on to other components of the device. The receiver 1310 may be an example of aspects of the transceiver 1535 described with reference to FIG. 15.

UE SPS manager 1315 may be an example of aspects of a UE SPS manager 1215, a UE SPS manager 1415, or a UE SPS manager 1515 described with reference to FIG. 12, 14, or 15.

UE SPS manager 1315 may also include carrier configuration component 1325, SPS periodicity component 1330, SPS communication component 1335, and HARQ feedback component 1340.

Carrier configuration component 1325 may receive signaling that indicates that a carrier is configured for SPS uplink transmissions, where a schedule for the SPS uplink transmissions is based on a HARQ process timing and a duration between TTIs designated for the SPS uplink transmissions.

SPS periodicity component 1330 may determine the duration between the TTIs designated for the SPS uplink transmissions based on the signaling.

SPS communication component 1335 may communicate with a base station 105 during the TTIs designated for the SPS uplink transmissions according to the schedule for the SPS uplink transmissions and the HARQ process timing and transmit an uplink message on a first TTI of the set of TTIs designated for the SPS uplink transmissions. In some examples, SPS communication component 1335 may retransmit the uplink message on a second TTI designated for the SPS uplink transmissions, where a timing of the retransmission is based on the schedule and the HARQ process timing. In some examples, SPS communication component 1335 may refrain from retransmitting the uplink message in a first uplink TTI that is designated for retransmission according to the HARQ process timing, where the set of TTIs designated for the SPS uplink transmissions excludes the first uplink TTI. In some examples, SPS communication component 1335 may retransmit the uplink message in a second uplink TTI of the set of TTIs designated for the SPS uplink transmissions. In some cases, communicating with the base station 105 includes transmitting an uplink message during a first TTI designated for the SPS uplink transmissions according to the schedule.

HARQ feedback component 1340 may receive a NACK, where retransmitting the uplink message on the second TTI designated for the SPS uplink transmissions is based on receiving the NACK and determine that the uplink message was unsuccessfully decoded based on an absence of signaling in a downlink TTI that is designated for HARQ feedback according to a HARQ process timing.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1535 described with reference to FIG. 15. The transmitter 1320 may include a single antenna, or it may include a set of antennas.

Figure 14:
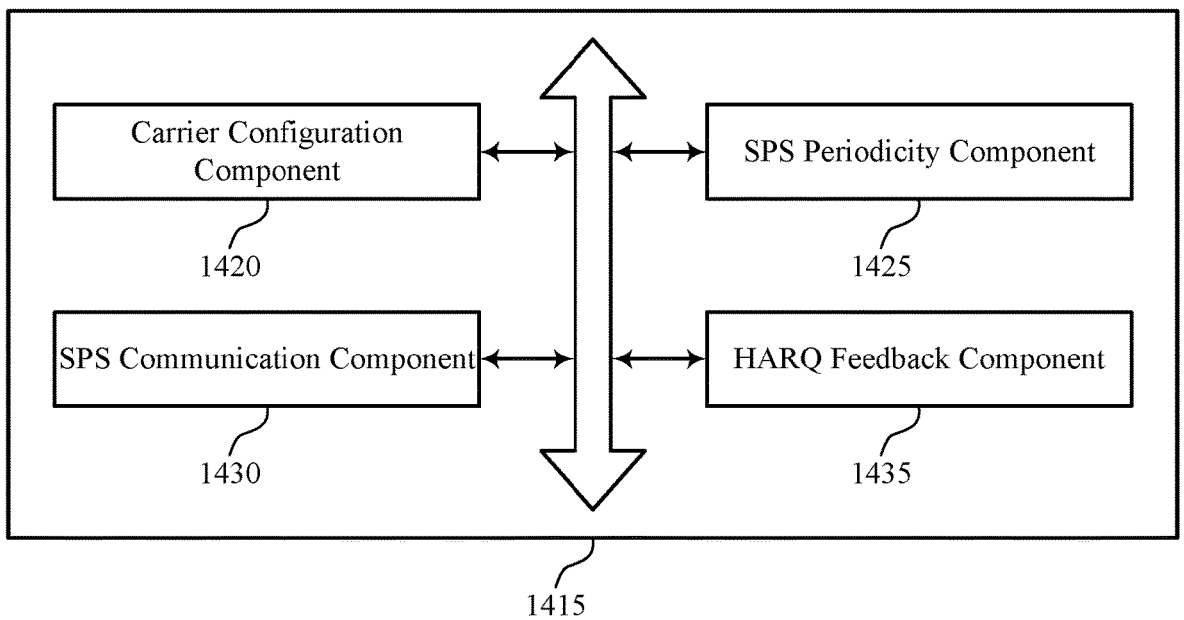

FIG. 14 shows a block diagram 1400 of a UE SPS manager 1415 that supports uplink SPS for low latency enhancement in accordance with various aspects of the present disclosure. The UE SPS manager 1415 may be an example of aspects of a UE SPS manager 1215, a UE SPS manager 1315, or a UE SPS manager 1515 described with reference to FIG. 12, 13, or 15. The UE SPS manager 1415 may include carrier configuration component 1420, SPS periodicity component 1425, SPS communication component 1430, and HARQ feedback component 1435. Each of these modules may communicate, directly or indirectly, with one another (e.g., via one or more buses).

Carrier configuration component 1420 may receive signaling that indicates that a carrier is configured for SPS uplink transmissions, where a schedule for the SPS uplink transmissions is based on a HARQ process timing and a duration between TTIs designated for the SPS uplink transmissions.

SPS periodicity component 1425 may determine the duration between the TTIs designated for the SPS uplink transmissions based on the signaling.

SPS communication component 1430 may communicate with a base station 105 during the TTIs designated for the SPS uplink transmissions according to the schedule for the SPS uplink transmissions and the HARQ process timing, retransmit the uplink message on a second TTI designated for the SPS uplink transmissions, where a timing of the retransmission is based on the schedule and the HARQ process timing, transmit an uplink message on a first TTI of the set of TTIs designated for the SPS uplink transmissions, refrain from retransmitting the uplink message in a first uplink TTI that is designated for retransmission according to the HARQ process timing, where the set of TTIs designated for the SPS uplink transmissions excludes the first uplink TTI, and retransmit the uplink message in a second uplink TTI of the set of TTIs designated for the SPS uplink transmissions. In some cases, communicating with the base station 105 includes transmitting an uplink message during a first TTI designated for the SPS uplink transmissions according to the schedule.

HARQ feedback component 1435 may receive a NACK, where retransmitting the uplink message on the second TTI designated for the SPS uplink transmissions is based on receiving the NACK and determine that the uplink message was unsuccessfully decoded based on an absence of signaling in a downlink TTI that is designated for HARQ feedback according to a HARQ process timing.

Figure 15:
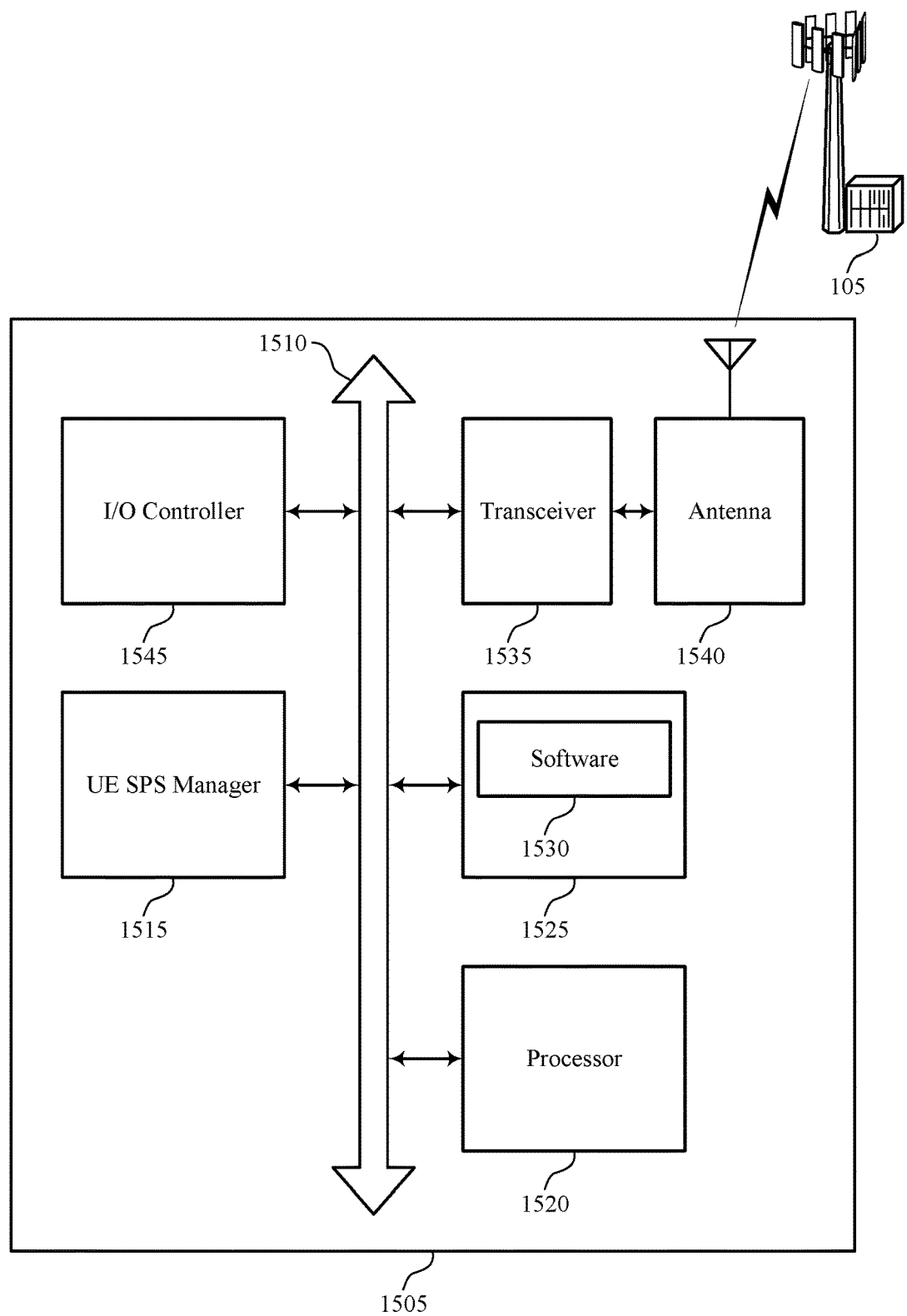
FIG. 15 illustrates a diagram of a system including a user equipment (UE) that supports uplink SPS for low latency enhancement in accordance with aspects of the present disclosure.

FIG. 15 shows a diagram of a system 1500 including a device 1505 that supports uplink SPS for low latency enhancement in accordance with various aspects of the present disclosure. Device 1505 may be an example of or include the components of UE 115 as described above, e.g., with reference to FIG. 1. Device 1505 may include components for bi-directional voice and data communications including components for transmitting and receiving communications, including UE SPS manager 1515, processor 1520, memory 1525, software 1530, transceiver 1535, antenna 1540, and I/O controller 1545. These components may be in electronic communication via one or more busses (e.g., bus 1510). Device 1505 may communicate wirelessly with one or more base stations 105.

Processor 1520 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1520 may be configured to operate a memory array using a memory controller. In other cases, a memory controller may be integrated into processor 1520. Processor 1520 may be configured to execute computer-readable instructions stored in a memory to perform various functions (e.g., functions or tasks supporting uplink SPS for low latency enhancement).

Memory 1525 may include RAM and ROM. The memory 1525 may store computer-readable, computer-executable software 1530 including instructions that, when executed, cause the processor to perform various functions described herein. In some cases, the memory 1525 may contain, among other things, a BIOS which may control basic hardware and/or software operation such as the interaction with peripheral components or devices.

Software 1530 may include code to implement aspects of the present disclosure, including code to support uplink SPS for low latency enhancement. Software 1530 may be stored in a non-transitory computer-readable medium such as system memory or other memory. In some cases, the software 1530 may not be directly executable by the processor but may cause a computer (e.g., when compiled and executed) to perform functions described herein.

Transceiver 1535 may communicate bi-directionally, via one or more antennas, wired, or wireless links as described above. For example, the transceiver 1535 may represent a wireless transceiver and may communicate bi-directionally with another wireless transceiver. The transceiver 1535 may also include a modem to modulate the packets and provide the modulated packets to the antennas for transmission, and to demodulate packets received from the antennas.

In some cases, the wireless device may include a single antenna 1540. However, in some cases the device may have more than one antenna 1540, which may be capable of concurrently transmitting or receiving multiple wireless transmissions.

I/O controller 1545 may manage input and output signals for device 1505. I/O controller 1545 may also manage peripherals not integrated into device 1505. In some cases, I/O controller 1545 may represent a physical connection or port to an external peripheral. In some cases, I/O controller 1545 may utilize an operating system such as iOS®, ANDROID®, MS-DOS®, MS-WINDOWS®, OS/2®, UNIX®, LINUX®, or another known operating system.

Figure 16:
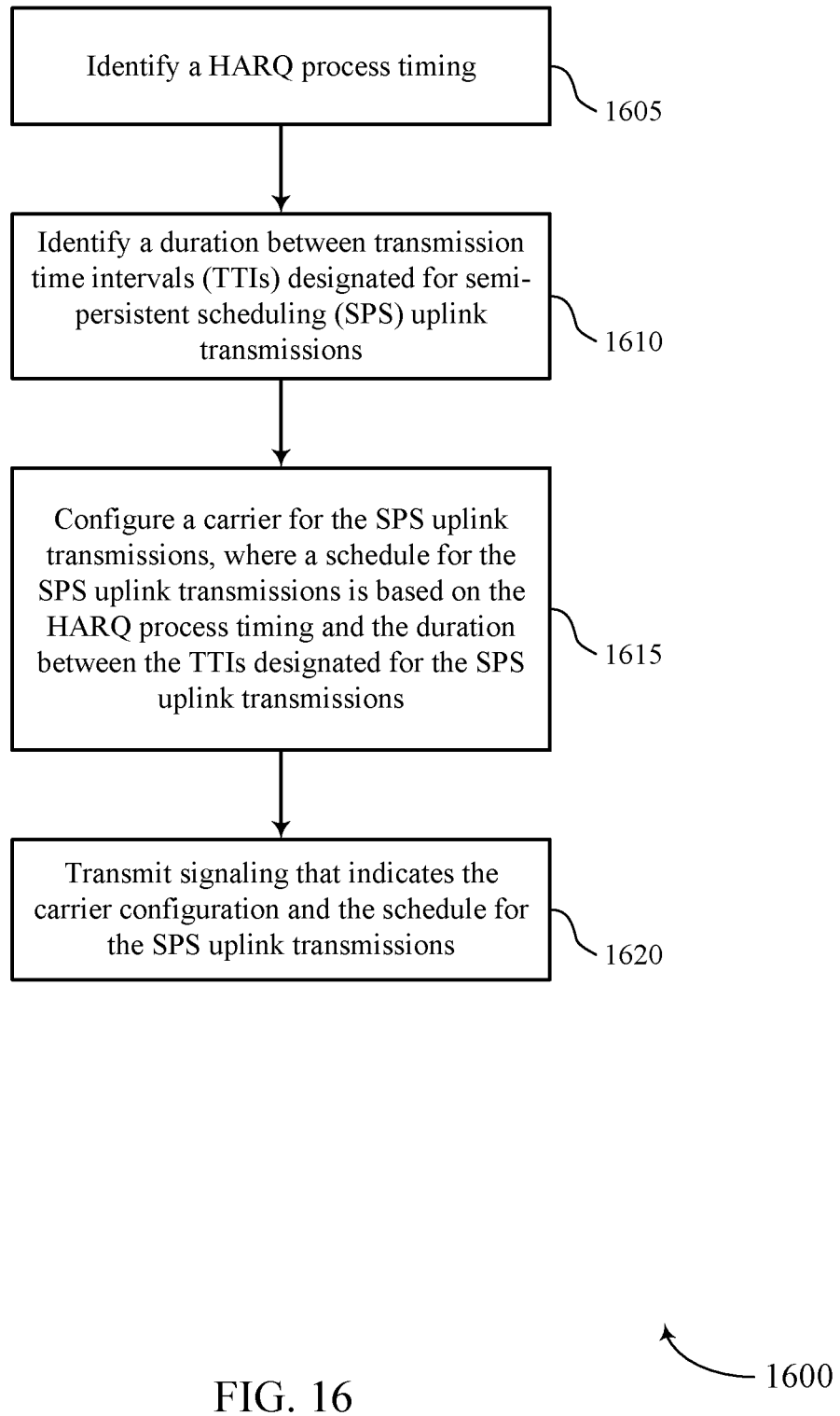
FIGS. 16 through 20 illustrate methods for uplink SPS for low latency enhancement in accordance with aspects of the present disclosure.

FIG. 16 shows a flowchart illustrating a method 1600 for uplink SPS for low latency enhancement in accordance with various aspects of the present disclosure. The operations of method 1600 may be implemented by a base station 105 or its components as described herein. For example, the operations of method 1600 may be performed by a base station SPS manager as described with reference to FIGS. 8 through 11. In some examples, a base station 105 may execute a set of codes to control the functional elements of the device to perform the functions described below. Additionally or alternatively, the base station 105 may perform aspects the functions described below using special-purpose hardware.

At block 1605 the base station 105 may identify a HARQ process timing. The operations of block 1605 may be performed according to the methods described with reference to FIGS. 1 through 7. In certain examples, aspects of the operations of block 1605 may be performed by a HARQ timing component as described with reference to FIGS. 8 through 11.

At block 1610 the base station 105 may identify a duration between TTIs designated for SPS uplink transmissions. The operations of block 1610 may be performed according to the methods described with reference to FIGS. 1 through 7. In certain examples, aspects of the operations of block 1610 may be performed by a SPS periodicity component as described with reference to FIGS. 8 through 11.

At block 1615 the base station 105 may configure a carrier for the SPS uplink transmissions, wherein a schedule for the SPS uplink transmissions is based at least in part on the HARQ process timing and the duration between the TTIs designated for the SPS uplink transmissions. The operations of block 1615 may be performed according to the methods described with reference to FIGS. 1 through 7. In certain examples, aspects of the operations of block 1615 may be performed by a carrier configuration component as described with reference to FIGS. 8 through 11.

At block 1620 the base station 105 may transmit signaling that indicates the carrier configuration and the schedule for the SPS uplink transmissions. The operations of block 1620 may be performed according to the methods described with reference to FIGS. 1 through 7. In certain examples, aspects of the operations of block 1620 may be performed by a SPS communication component as described with reference to FIGS. 8 through 11.

Figure 17:
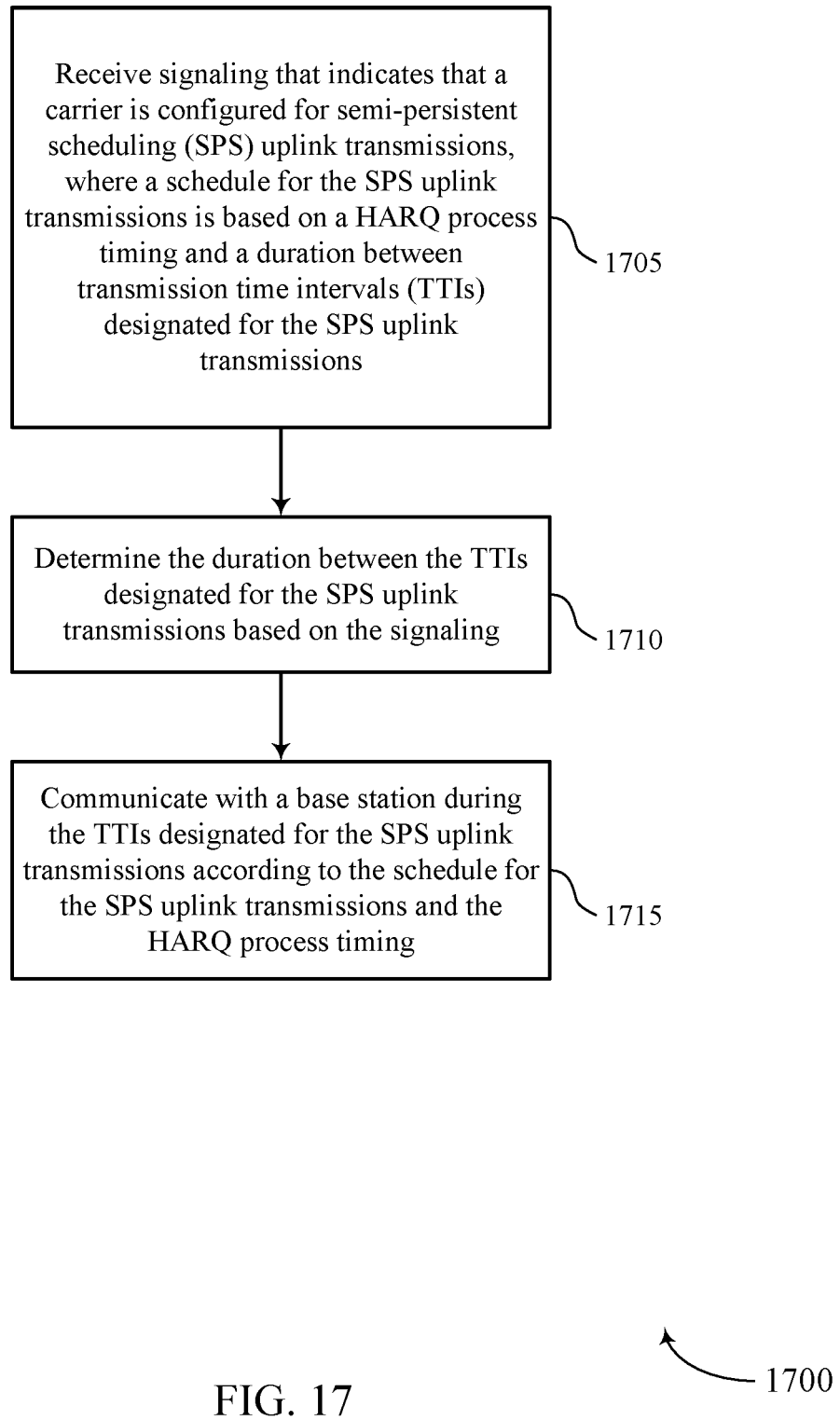

FIG. 17 shows a flowchart illustrating a method 1700 for uplink SPS for low latency enhancement in accordance with various aspects of the present disclosure. The operations of method 1700 may be implemented by a UE 115 or its components as described herein. For example, the operations of method 1700 may be performed by a UE SPS manager as described with reference to FIGS. 12 through 15. In some examples, a UE 115 may execute a set of codes to control the functional elements of the device to perform the functions described below. Additionally or alternatively, the UE 115 may perform aspects the functions described below using special-purpose hardware.

At block 1705 the UE 115 may receive signaling that indicates that a carrier is configured for SPS uplink transmissions, wherein a schedule for the SPS uplink transmissions is based at least in part on a HARQ process timing and a duration between TTIs designated for the SPS uplink transmissions. The operations of block 1705 may be performed according to the methods described with reference to FIGS. 1 through 7. In certain examples, aspects of the operations of block 1705 may be performed by a carrier configuration component as described with reference to FIGS. 12 through 15.

At block 1710 the UE 115 may determine the duration between the TTIs designated for the SPS uplink transmissions based at least in part on the signaling. The operations of block 1710 may be performed according to the methods described with reference to FIGS. 1 through 7. In certain examples, aspects of the operations of block 1710 may be performed by a SPS periodicity component as described with reference to FIGS. 12 through 15.

At block 1715 the UE 115 may communicate with a base station 105 during the TTIs designated for the SPS uplink transmissions according to the schedule for the SPS uplink transmissions and the HARQ process timing. The operations of block 1715 may be performed according to the methods described with reference to FIGS. 1 through 7. In certain examples, aspects of the operations of block 1715 may be performed by a SPS communication component as described with reference to FIGS. 12 through 15.

Figure 18:
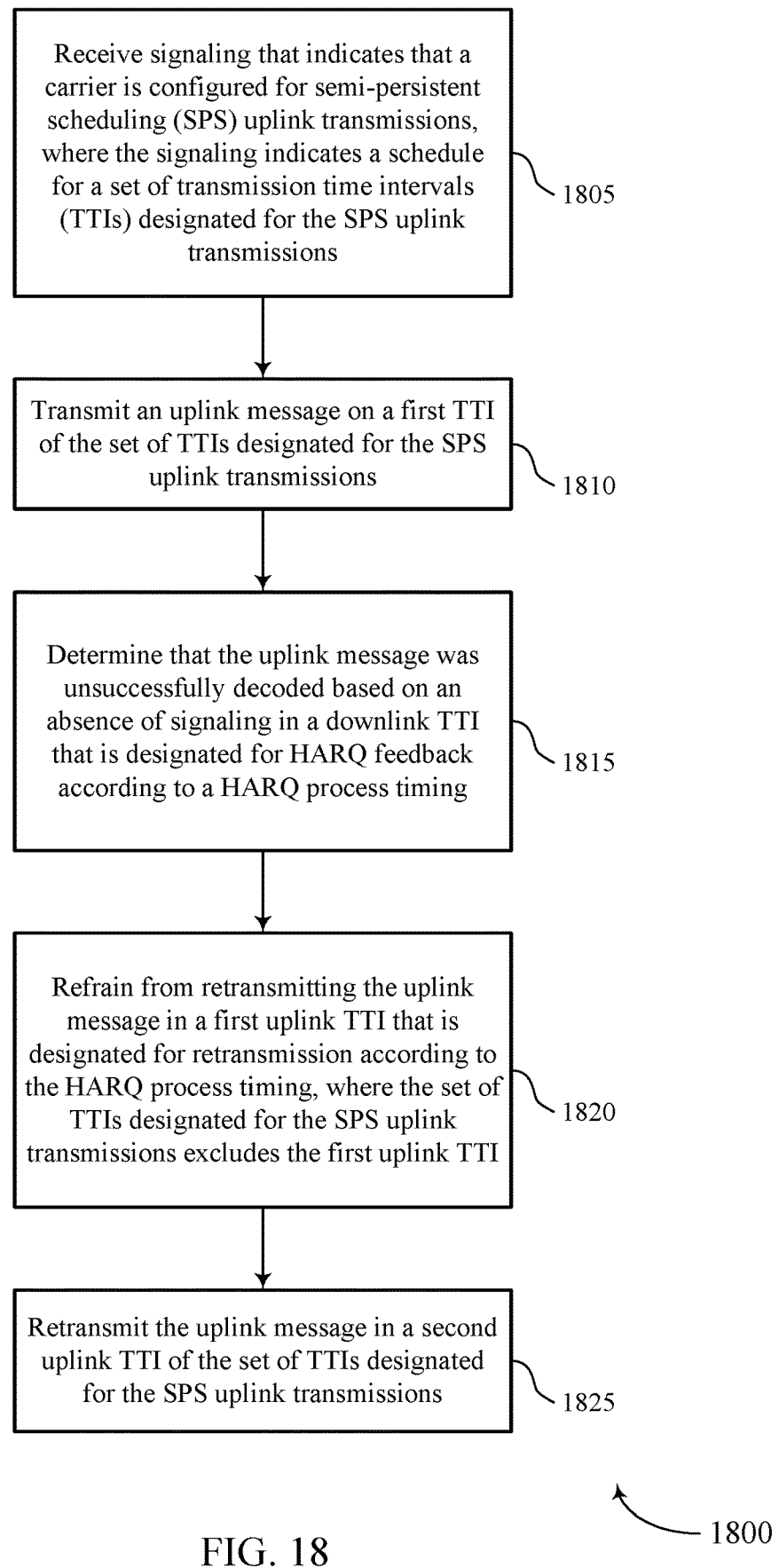

FIG. 18 shows a flowchart illustrating a method 1800 for uplink SPS for low latency enhancement in accordance with various aspects of the present disclosure. The operations of method 1800 may be implemented by a UE 115 or its components as described herein. For example, the operations of method 1800 may be performed by a UE SPS manager as described with reference to FIGS. 12 through 15. In some examples, a UE 115 may execute a set of codes to control the functional elements of the device to perform the functions described below. Additionally or alternatively, the UE 115 may perform aspects the functions described below using special-purpose hardware.

At block 1805 the UE 115 may receive signaling that indicates that a carrier is configured for SPS uplink transmissions, wherein the signaling indicates a schedule for a plurality of TTIs designated for the SPS uplink transmissions. The operations of block 1805 may be performed according to the methods described with reference to FIGS. 1 through 7. In certain examples, aspects of the operations of block 1805 may be performed by a carrier configuration component as described with reference to FIGS. 12 through 15.

At block 1810 the UE 115 may transmit an uplink message on a first TTI of the plurality of TTIs designated for the SPS uplink transmissions. The operations of block 1810 may be performed according to the methods described with reference to FIGS. 1 through 7. In certain examples, aspects of the operations of block 1810 may be performed by a SPS communication component as described with reference to FIGS. 12 through 15.

At block 1815 the UE 115 may determine that the uplink message was unsuccessfully decoded based at least in part on an absence of signaling in a downlink TTI that is designated for HARQ feedback according to a HARQ process timing. The operations of block 1815 may be performed according to the methods described with reference to FIGS. 1 through 7. In certain examples, aspects of the operations of block 1815 may be performed by a HARQ feedback component as described with reference to FIGS. 12 through 15.

At block 1820 the UE 115 may refrain from retransmitting the uplink message in a first uplink TTI that is designated for retransmission according to the HARQ process timing, wherein the plurality of TTIs designated for the SPS uplink transmissions excludes the first uplink TTI. The operations of block 1820 may be performed according to the methods described with reference to FIGS. 1 through 7. In certain examples, aspects of the operations of block 1820 may be performed by a SPS communication component as described with reference to FIGS. 12 through 15.

At block 1825 the UE 115 may retransmit the uplink message in a second uplink TTI of the plurality of TTIs designated for the SPS uplink transmissions. The operations of block 1825 may be performed according to the methods described with reference to FIGS. 1 through 7. In certain examples, aspects of the operations of block 1825 may be performed by a SPS communication component as described with reference to FIGS. 12 through 15.

Figure 19:
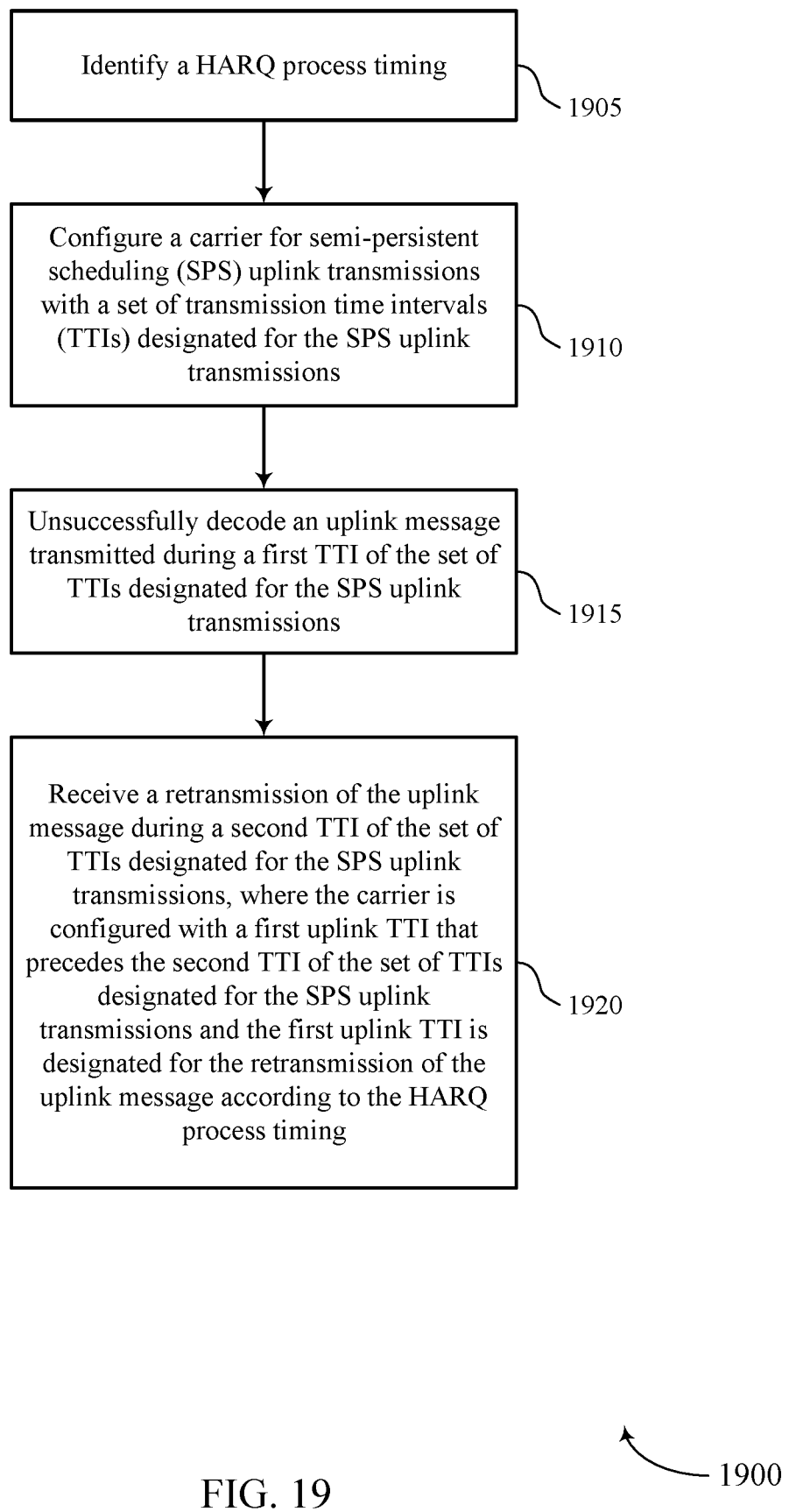

FIG. 19 shows a flowchart illustrating a method 1900 for uplink SPS for low latency enhancement in accordance with various aspects of the present disclosure. The operations of method 1900 may be implemented by a base station 105 or its components as described herein. For example, the operations of method 1900 may be performed by a base station SPS manager as described with reference to FIGS. 8 through 11. In some examples, a base station 105 may execute a set of codes to control the functional elements of the device to perform the functions described below. Additionally or alternatively, the base station 105 may perform aspects the functions described below using special-purpose hardware.

At block 1905 the base station 105 may identify a HARQ process timing. The operations of block 1905 may be performed according to the methods described with reference to FIGS. 1 through 7. In certain examples, aspects of the operations of block 1905 may be performed by a HARQ timing component as described with reference to FIGS. 8 through 11.

At block 1910 the base station 105 may configure a carrier for SPS uplink transmissions with a plurality of TTIs designated for the SPS uplink transmissions. The operations of block 1910 may be performed according to the methods described with reference to FIGS. 1 through 7. In certain examples, aspects of the operations of block 1910 may be performed by a carrier configuration component as described with reference to FIGS. 8 through 11.

At block 1915 the base station 105 may unsuccessfully decode an uplink message transmitted during a first TTI of the plurality of TTIs designated for the SPS uplink transmissions. The operations of block 1915 may be performed according to the methods described with reference to FIGS. 1 through 7. In certain examples, aspects of the operations of block 1915 may be performed by a HARQ feedback component as described with reference to FIGS. 8 through 11.

At block 1920 the base station 105 may receive a retransmission of the uplink message during a second TTI of the plurality of TTIs designated for the SPS uplink transmissions, wherein the carrier is configured with a first uplink TTI that precedes the second TTI of the plurality of TTIs designated for the SPS uplink transmissions and the first uplink TTI is designated for the retransmission of the uplink message according to the HARQ process timing. The operations of block 1920 may be performed according to the methods described with reference to FIGS. 1 through 7. In certain examples, aspects of the operations of block 1920 may be performed by a SPS communication component as described with reference to FIGS. 8 through 11.

Figure 20:
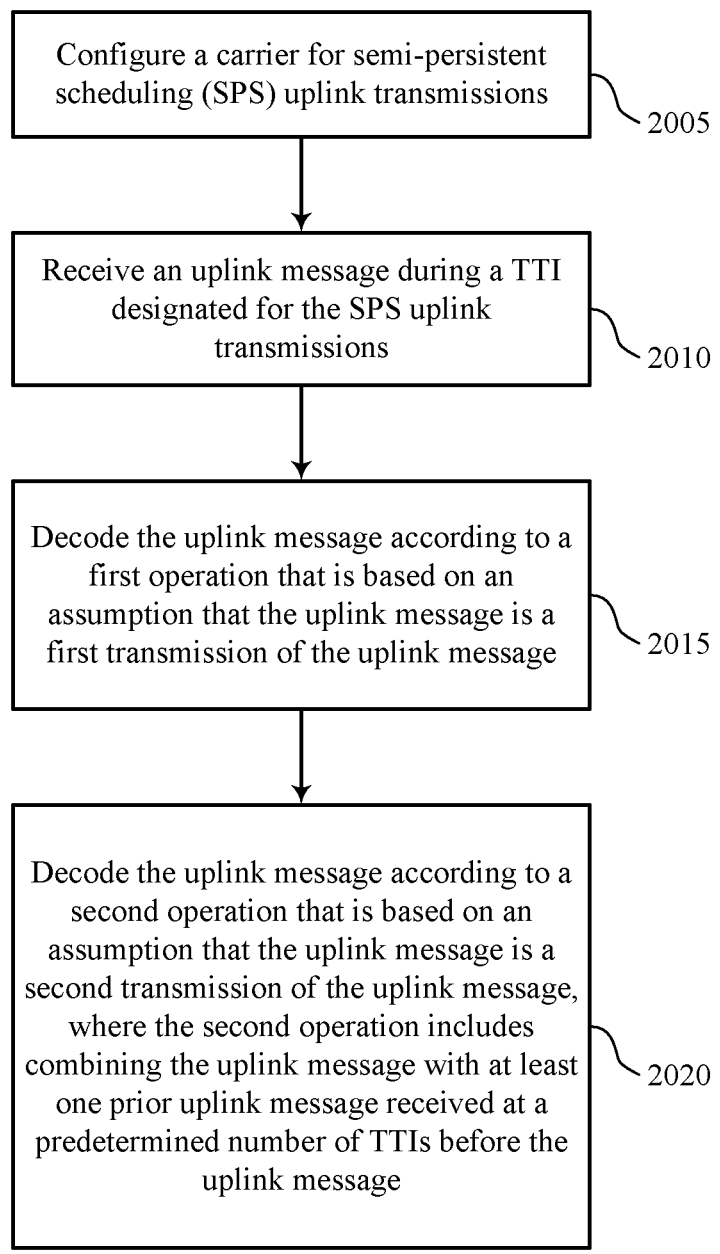

FIG. 20 shows a flowchart illustrating a method 2000 for uplink SPS for low latency enhancement in accordance with various aspects of the present disclosure. The operations of method 2000 may be implemented by a base station 105 or its components as described herein. For example, the operations of method 2000 may be performed by a base station SPS manager as described with reference to FIGS. 8 through 11. In some examples, a base station 105 may execute a set of codes to control the functional elements of the device to perform the functions described below. Additionally or alternatively, the base station 105 may perform aspects the functions described below using special-purpose hardware.

At block 2005 the base station 105 may configure a carrier for SPS uplink transmissions. The operations of block 2005 may be performed according to the methods described with reference to FIGS. 1 through 7. In certain examples, aspects of the operations of block 2005 may be performed by a carrier configuration component as described with reference to FIGS. 8 through 11.

At block 2010 the base station 105 may receive an uplink message during a TTI designated for the SPS uplink transmissions. The operations of block 2010 may be performed according to the methods described with reference to FIGS. 1 through 7. In certain examples, aspects of the operations of block 2010 may be performed by a SPS communication component as described with reference to FIGS. 8 through 11.

At block 2015 the base station 105 may decode the uplink message according to a first operation that is based at least in part on an assumption that the uplink message is a first transmission of the uplink message. The operations of block 2015 may be performed according to the methods described with reference to FIGS. 1 through 7. In certain examples, aspects of the operations of block 2015 may be performed by a HARQ decoding component as described with reference to FIGS. 8 through 11.

At block 2020 the base station 105 may decode the uplink message according to a second operation that is based at least in part on an assumption that the uplink message is a second transmission of the uplink message, wherein the second operation comprises combining the uplink message with at least one prior uplink message received at a predetermined number of TTIs before the uplink message. The operations of block 2020 may be performed according to the methods described with reference to FIGS. 1 through 7. In certain examples, aspects of the operations of block 2020 may be performed by a HARQ decoding component as described with reference to FIGS. 8 through 11.

In some examples, aspects from two or more of the methods 1600, 1700, 1800, 1900, or 2000 described with reference to FIG. 16, 17, 18, 19, or 20 may be combined. It should be noted that the methods 1600, 1700, 1800, 1900, and 2000 are just example implementations, and that the operations of the 1600, 1700, 1800, 1900, or 2000 may be rearranged or otherwise modified such that other implementations are possible.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE system may be described for purposes of example, and LTE terminology may be used in much of the description, the techniques described herein are applicable beyond LTE applications.

In LTE/LTE-A networks, including such networks described herein, the term evolved node B (eNB) may be generally used to describe the base stations. The wireless communications system or systems described herein may include a heterogeneous LTE/LTE-A network in which different types of evolved node B (eNBs) provide coverage for various geographical regions. For example, each eNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, the phrase "based on" shall not be construed as a reference to a closed set of conditions. For example, an exemplary feature that is described as "based on condition A" may be based on both a condition A and a condition B without departing from the scope of the present disclosure. In other words, as used herein, the phrase "based on" shall be construed in the same manner as the phrase "based at least in part on."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
identifying a hybrid automatic repeat request (HARQ) process timing;
identifying a duration between transmission time intervals (TTIs) designated for semi-persistent scheduling (SPS) uplink transmissions;
configuring a carrier for the SPS uplink transmissions, wherein a schedule for the SPS uplink transmissions overlaps the HARQ process timing with the TTIs designated for the SPS uplink transmissions based at least in part on the duration between the TTIs designated for the SPS uplink transmissions; and
transmitting signaling that indicates the carrier configuration and the schedule for the SPS uplink transmissions.

2. The method of claim 1, further comprising:
receiving an uplink message during a first TTI designated for the SPS uplink transmissions according to the schedule; and
receiving a retransmission of the uplink message on a second TTI designated for the SPS uplink transmissions, wherein a timing of the retransmission is based at least in part on the schedule and the HARQ process timing.

3. The method of claim 1, further comprising:
configuring the duration between TTIs designated for the SPS uplink transmissions based at least in part on the HARQ process timing.

4. The method of claim 3, wherein the duration between TTIs designated for the SPS uplink transmissions is configured to support retransmission of an uplink message according to the HARQ process timing during a TTI designated for the SPS uplink transmissions.

5. The method of claim 3, wherein the HARQ process timing comprises a duration of eight TTIs between transmissions and retransmissions.

6. The method of claim 1, further comprising:
configuring the HARQ process timing based at least in part on the duration between TTIs designated for the SPS uplink transmissions.

7. The method of claim 6, wherein the duration between TTIs designated for the SPS uplink transmissions is configured to support retransmission of an uplink message according to the HARQ process timing during a TTI designated for the SPS uplink transmissions.

8. The method of claim 6, wherein the duration between the TTIs designated for the SPS uplink transmissions comprises a duration of ten TTIs.

9. A method for wireless communication, comprising:
receiving signaling that indicates that a carrier is configured for semi-persistent scheduling (SPS) uplink transmissions, wherein a schedule for the SPS uplink transmissions overlaps a hybrid automatic repeat request (HARQ) process timing with transmission time intervals (TTIs) designated for the SPS uplink transmissions based at least in part on a duration between the TTIs designated for the SPS uplink transmissions;
determining the duration between the TTIs designated for the SPS uplink transmissions based at least in part on the signaling; and
communicating with a base station during the TTIs designated for the SPS uplink transmissions according to the schedule for the SPS uplink transmissions and the HARQ process timing.

10. The method of claim 9, wherein communicating with the base station comprises:
transmitting an uplink message during a first TTI designated for the SPS uplink transmissions according to the schedule; and
retransmitting the uplink message on a second TTI designated for the SPS uplink transmissions, wherein a timing of the retransmission is based at least in part on the schedule and the HARQ process timing.

11. The method of claim 10, further comprising:
receiving a negative acknowledgement (NACK), wherein retransmitting the uplink message on the second TTI designated for the SPS uplink transmissions is based at least in part on receiving the NACK.

12. An apparatus for wireless communication, in a system comprising:
a processor;
memory in electronic communication with the processor; and
instructions stored in the memory and executable by the processor to cause the apparatus to:
identify a hybrid automatic repeat request (HARQ) process timing;
identify a duration between transmission time intervals (TTIs) designated for semi-persistent scheduling (SPS) uplink transmissions;
configure a carrier for the SPS uplink transmissions, wherein a schedule for the SPS uplink transmissions overlaps the HARQ process timing with the TTIs designated for the SPS uplink transmissions based at least in part on the duration between the TTIs designated for the SPS uplink transmissions; and
transmit signaling that indicates the carrier configuration and the schedule for the SPS uplink transmissions.

13. The apparatus of claim 12, further comprising instructions stored in the memory and executable by the processor to cause the apparatus to:
receive an uplink message during a first TTI designated for the SPS uplink transmissions according to the schedule; and
receive a retransmission of the uplink message on a second TTI designated for the SPS uplink transmissions, wherein a timing of the retransmission is based at least in part on the schedule and the HARQ process timing.

14. The apparatus of claim 12, further comprising instructions stored in the memory and executable by the processor to cause the apparatus to:
configure the duration between TTIs designated for the SPS uplink transmissions based at least in part on the HARQ process timing.

15. The apparatus of claim 14, wherein the duration between TTIs designated for the SPS uplink transmissions is configured to support retransmission of an uplink message according to the HARQ process timing during a TTI designated for the SPS uplink transmissions.

16. The apparatus of claim 14, wherein the HARQ process timing comprises a duration of eight TTIs between transmissions and retransmissions.

17. The apparatus of claim 12, further comprising instructions stored in the memory and executable by the processor to cause the apparatus to:
configure the HARQ process timing based at least in part on the duration between TTIs designated for the SPS uplink transmissions.

18. The apparatus of claim 17, wherein the duration between TTIs designated for the SPS uplink transmissions is configured to support retransmission of an uplink message according to the HARQ process timing during a TTI designated for the SPS uplink transmissions.

19. The apparatus of claim 17, wherein the duration between the TTIs designated for the SPS uplink transmissions comprises a duration of ten TTIs.

20. An apparatus for wireless communication, in a system comprising:
a processor;
memory in electronic communication with the processor; and
instructions stored in the memory and executable by the processor to cause the apparatus to:
receive signaling that indicates that a carrier is configured for semi-persistent scheduling (SPS) uplink transmissions, wherein a schedule for the SPS uplink transmissions overlaps a hybrid automatic repeat request (HARQ) process timing with transmission time intervals (TTIs) designated for the SPS uplink transmissions based at least in part on a duration between the TTIs designated for the SPS uplink transmissions;
determine the duration between the TTIs designated for the SPS uplink transmissions based at least in part on the signaling; and
communicate with a base station during the TTIs designated for the SPS uplink transmissions according to the schedule for the SPS uplink transmissions and the HARQ process timing.

21. The apparatus of claim 20, wherein the instructions to communicate with the base station are executable by the processor to cause the apparatus to:
transmit an uplink message during a first TTI designated for the SPS uplink transmissions according to the schedule; and
retransmit the uplink message on a second TTI designated for the SPS uplink transmissions, wherein a timing of the retransmission is based at least in part on the schedule and the HARQ process timing.

22. The method of claim 20, further comprising instructions stored in the memory and executable by the processor to cause the apparatus to:
receive a negative acknowledgement (NACK), wherein retransmitting the uplink message on the second TTI designated for the SPS uplink transmissions is based at least in part on receiving the NACK.

* * * * *